(12) United States Patent
Rouindej

(10) Patent No.: US 12,326,139 B2
(45) Date of Patent: Jun. 10, 2025

(54) SYSTEMS AND METHODS FOR COMPRESSED AIR ENERGY STORAGE AND CONTROL THEREOF

(71) Applicant: Kamyar Rouindej, Waterloo (CA)

(72) Inventor: Kamyar Rouindej, Waterloo (CA)

( * ) Notice: Subject to any disclaimer, the term of this patent is extended or adjusted under 35 U.S.C. 154(b) by 0 days.

(21) Appl. No.: 18/662,198

(22) Filed: May 13, 2024

(65) Prior Publication Data

US 2024/0384709 A1 Nov. 21, 2024

Related U.S. Application Data

(63) Continuation of application No. 17/800,780, filed as application No. PCT/CA2021/050229 on Feb. 25, 2021, now Pat. No. 12,110,877.

(60) Provisional application No. 62/981,086, filed on Feb. 25, 2020.

(51) Int. Cl.
*F03G 7/00* (2006.01)
*F01K 3/02* (2006.01)
*F01K 3/08* (2006.01)
*F02C 6/16* (2006.01)
*H02J 15/00* (2006.01)

(52) U.S. Cl.
CPC .............. *F03G 7/0254* (2021.08); *F01K 3/02* (2013.01); *F01K 3/08* (2013.01); *F02C 6/16* (2013.01); *F03G 7/027* (2021.08); *H02J 15/006* (2013.01)

(58) Field of Classification Search
CPC .......... F03G 7/0254; F03G 7/027; F01K 3/02; F01K 3/08; F02C 6/16; H02J 15/006
See application file for complete search history.

(56) References Cited

FOREIGN PATENT DOCUMENTS

CN 107741172 A * 2/2018

* cited by examiner

*Primary Examiner* — Audrey B. Walter
(74) *Attorney, Agent, or Firm* — Own Innovation; James W. Hinton; Kent C. Howe

(57) ABSTRACT

Systems, methods, and devices for energy storage are provided. A system for energy storage includes a thermomechanical-electrical conversion subsystem for converting energy formats and a mechanical and thermal storage unit for storing energy formats. The thermomechanical-electrical conversion subsystem includes a storage subsystem including a compressor and a first thermal energy exchanger and a generation subsystem including a power generator and a second thermal energy exchanger. The storage subsystem compresses a fluid to generate compressed fluid and thermal energy. The generation subsystem generates power from the compressed fluid and the thermal energy. The mechanical and thermal storage unit includes a pressure vessel for storing the compressed fluid and a thermal energy storage for storing the thermal energy generated by the fluid compression and for providing the thermal energy to the generation subsystem for generating power.

18 Claims, 11 Drawing Sheets

SYSTEMS AND METHODS FOR COMPRESSED AIR ENERGY STORAGE AND CONTROL THEREOF

TECHNICAL FIELD

The following relates generally to energy storage and management, and more particularly to systems and methods for compressed air energy storage for combined heat and power and control thereof.

INTRODUCTION

Large industrial and commercial facilities are energy intensive customers of the electrical system and can have a significant impact on peak management of the grid. As such, in most electrical distribution systems, there are different pricing categories for these types of users. This type of pricing may focus on both total energy used (kWh) and peak power demand on the system (KW). This may act as an incentive for these sites for better energy and demand management.

Peak electricity demand charges can represent up to 30% of utility bills. For example, Ontarians paid $11B in 2018 for peak demand.

Energy used in facilities is primarily for lighting, motors, and operation of equipment (electricity), conditioning of environment (electricity or gas), and thermal power used in process manufacturing (electricity or gas). Depending on the type of facility and operation, any combination of these may be used at a particular site. Having different functions, these applications usually operate and function as separate systems, which can result in significant energy wasted in the conversion process and missed opportunity for utilization.

Systems and methods are desired that can manage, significantly reduce, and increase flexibility in electricity demand and energy intensity of these types of facilities.

Accordingly, there is a need for improved systems and methods for systems and methods for energy storage, management, and use that overcome at least some of the disadvantages of existing approaches.

SUMMARY

A system for energy storage is provided. The system includes a thermomechanical-electrical conversion subsystem for converting energy formats. The thermomechanical-electrical conversion subsystem includes a storage subsystem including a fluid compressor and a first thermal exchanger and a generation subsystem including a power generator and a second thermal energy exchanger. The storage subsystem is for compression of a fluid to generate compressed fluid and thermal energy. The generation subsystem is for generating power from the compressed fluid and the thermal energy. The system also includes a mechanical and thermal storage unit for storing energy formats. The mechanical and thermal storage unit includes a pressure vessel for storing the compressed fluid and a thermal energy storage for storing the thermal energy generated by the fluid compression and for providing the thermal energy to the generation subsystem for generating power.

The energy formats may include any two or more of electricity, thermal energy, and pneumatic energy.

The energy formats may include electricity, thermal energy, and pneumatic energy.

The compressed fluid may be compressed air, and the energy formats may include electricity and at least one of thermal energy and pneumatic energy.

The compressed fluid may be compressed air having a pressure between 4 MPa and 70 MPa.

The pressure vessel may be located above ground and may be composed of high-strength steel or composite.

The pressure vessel may be located underground in a borehole.

The borehole may include a first vertical segment housing the pressure vessel and a second vertical segment housing the thermal energy storage.

The pressure vessel may include an outer casing enclosing an inner compartment for storing the compressed fluid. The outer casing may be composed of a thermally insulating material.

The power generator may be a microturbine having a capacity range of 250 kW to 25 MW.

The thermal energy storage may include at least one of an underground thermal energy storage using ground as storage medium, a phase change storage, a thermo-chemical storage, and a cool thermal energy storage.

The system may include an end-use device which is fluidly connected to at least one of the thermal and mechanical storage unit and the thermomechanical-electrical conversion subsystem via a fluid transportation subsystem. The end-use device receives an energy format generated by the system.

The energy format received by the end-use device may be electricity, thermal energy, or pneumatic energy.

The end-use device may be an air treatment unit or a process heating unit, and the energy format received by the end-use device may be thermal energy.

The end-use device may be a compressed air-powered device the energy format received by the end-use device may be pneumatic energy.

The system may operate at a facility having a demand range of 1 MW to 5 MW.

The system may include a flow transportation subsystem for fluidly connecting the thermomechanical-electrical conversion subsystem and the mechanical and thermal storage unit and transportation of a working fluid therebetween.

The system may include an energy management unit including a computing device in communication with at least one control device. The energy management unit may be configured to: monitor energy format demand data for at least one energy format; determine a control operation based on the energy format demand data; and generate control data encoding instructions for performing the control operation, wherein the control data, when received by the at least one control device, causes the control device to perform at least one of: adjusting a flow of a working fluid between the mechanical and thermal storage unit and the thermomechanical-electrical subsystem; and adjusting an operating parameter of at least one of the storage subsystem and the generation subsystem.

The compressed fluid may be compressed air, and the system may further comprise an electric heater for heating the compressed air after being heated by the second thermal energy exchanger and prior to entering the power generator.

The system may further comprise a first temperature sensor for recording a first temperature measurement of the compressed air prior to entering the second thermal energy exchanger, a second temperature sensor for recording a second temperature measurement of the compressed air after passing through the second thermal energy exchanger, and a control unit. The control unit receives the first and second temperature measurements from the first and second temperature sensors, respectively, controls flow of the thermal energy from the thermal energy storage to the second thermal energy exchanger based on the first temperature measurement, and controls a heat output of the electric heater based on the second temperature measurement.

An energy management device for controlling storage and delivery of a plurality of energy formats by an energy storage system is also provided. The energy storage system includes a flow transportation subsystem fluidly connecting a storage subsystem, a generation subsystem, a thermal energy storage, and a pressure vessel. The energy management device includes a memory for storing system optimization rules. The energy management device also includes a communication interface configured to: receive thermal energy stored data from a sensor located at the thermal energy storage, the thermal energy stored data indicating a quantity of thermal energy stored by the thermal energy storage; receive compressed fluid stored data from a sensor located at the pressure vessel, the compressed fluid stored data indicating a quantity of compressed fluid stored by the pressure vessel; and receive energy service demand data including a first energy format demand and a second energy format demand. The energy management device also includes a processor configured to: determine operating parameters for each of the storage subsystem, the generation subsystem, and the flow transportation subsystem based on the thermal energy stored data, compressed fluid stored data, energy service demand data, and system optimization rules; generate control data encoding instructions for implementing the determined operating parameters. The communication interface may be further configured to transmit the control data to a control device of at least one of the flow transportation subsystem, the storage subsystem, and the generation subsystem.

The operating parameters may include a valve status for a valve of the flow transportation subsystem. The valve status may be open or closed.

The generation subsystem may include a power generator. The operating parameters may include a power generator status. The power generator status may be on or off.

The storage subsystem may include a fluid compressor. The operating parameters may include a fluid compressor status. The fluid compressor status may be on or off.

The first and second energy formats may be any two of electricity, thermal energy, and pneumatic energy.

The compressed fluid may be compressed air, the first energy format may be electricity, and the second energy format may be thermal energy or pneumatic energy.

The energy service demand data further may include a third energy format demand.

The system optimization rules may consider at least one of reducing electricity demand and reducing waste energy by the system.

A method of controlling an energy storage system operating at a facility is also provided. The energy storage system includes a flow transportation subsystem fluidly connecting a storage subsystem, a generation subsystem, a thermal energy storage, and a pressure vessel. The method includes: determining operating parameters for each of the storage subsystem, the generation subsystem, and the flow transportation subsystem based on thermal energy stored data indicating a quantity of thermal energy stored by the thermal energy storage, compressed air stored data indicating a quantity of compressed fluid stored by the pressure vessel, power service demand data, second energy service demand data, and system optimization rules. The method also includes generating control data encoding instructions for implementing the determined operating parameters. The method also includes transmitting the control data to a control device of each of the flow transportation subsystem, storage subsystem, and generation subsystem.

The operating parameters may include a valve status for a valve of the flow transportation subsystem, and the valve status may be open or closed.

The generation subsystem may include a power generator, the operating parameters may include a power generator status, and the power generator status may be on or off.

The storage subsystem may include a fluid compressor, the operating parameters may include a fluid compressor status, and the fluid compressor status may be on or off.

The second energy service may be a thermal energy service or a pneumatic energy service.

The method may include receiving third energy service demand data, where the second energy service is a thermal energy service and the third energy service is a pneumatic energy service.

The system optimization rules may consider at least one of reducing electricity demand and reducing waste energy by the system.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
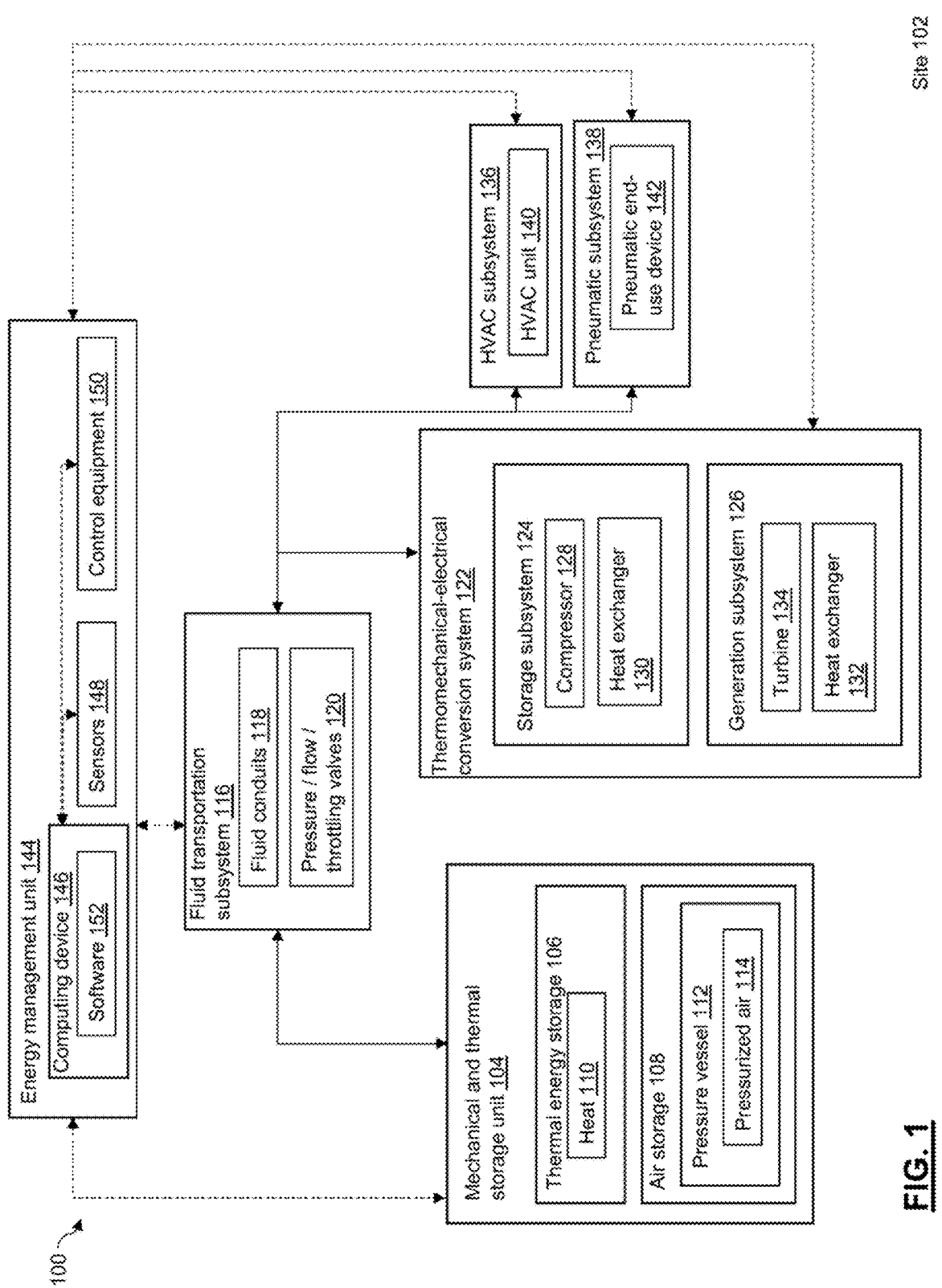
FIG. 1 is a block diagram of a compressed air energy storage (CAES) system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to energy storage and management, and more particularly to systems and methods for compressed air energy storage for combined heat and power and control and management thereof.

The systems and methods of the present disclosure may manage, significantly reduce, and increase flexibility of electricity demand and energy intensity of energy-intensive facilities, such as large industrial and commercial facilities.

A compressed air energy storage system ("CAES") for combined heat and power ("CHP") function (referred to generally as "CAES system" herein) is provided. Systems for managing operation and control of CAES systems are also provided. Energy used in facilities is mainly for lighting, motors, and operation of equipment (electricity), conditioning of environment (electricity or gas), and thermal power used in process manufacturing (electricity or gas). Depending on the type of facility and operation, any number of these can be used at a site. Having different functions, they may be operated and function as separate systems which results in significant energy wasted in the conversion process and missed opportunities for utilization. The systems and methods of the present disclosure recognize these problems and are designed to address them, such as by reducing wasted energy from conversion and improving utilization.

In an embodiment, a CAES system is provided that includes a mechanical and thermal storage subsystem, a thermomechanical-electrical conversion system, and an energy management unit. The CAES system can provide services including power services, HVAC (cooling and heating) services, and pneumatic services. The CAES system may advantageously be configured and used to store electricity when demand is low and generate electricity when demand is high. The CAES system may also advantageously be configured to manage and control the generation, storage, and use of a plurality of energy types using an integrated approach. This may be done, for example, by determining when certain energy types are needed or desired based on criteria stored in computing components of the system, and subsequently instructing system components to perform necessary actions to bring the system into compliance with the determination.

Generally, the CAES system uses energy delivered to the system to run an air compressor. The energy delivered to the system may be excess or off-peak power that is used to compress the air. The air compressor pressurizes the air and pushes or pumps the compressed air into a storage vessel for later use. At a later time, such as when there is an electricity demand, the CAES system uses the stored air to run a generation subsystem (e.g. gas-fired turbine generator). This may include releasing the pressurized air back to the surface, heating the air, and using the air to turn a turbine, which generates electricity.

The storage vessel may be underground. The storage vessel may be a natural storage vessel, such as an underground cavern.

The system provides an integration of software and hardware controllers. Sensors may be positioned in various parts of the building which can be used by the system process as it continuously monitors the inflow and outflow of heat and energy (electricity-compressed air). Depending on the direction and magnitude of energy/heat required, the system can be configured to bring onboard or disable the related hardware to optimize the energy balance in the system.

The structure of the compressed air storage may reduce the need to dissipate the heat generated during the air compression process, which may make the process close to Adiabatic and Isentropic. The structure providing this advantage may include low conductivity soil and vessel casing (casing of the compressed air storage).

The air may be compressed during off-peak hours and the hot, pressurized air stored in the pressure vessel.

During operating hours of the receiving facility, the system may pass the stored compressed air through a generation subsystem (e.g. microturbine) to generate onsite electricity and reduce demand.

The CAES system includes an energy management unit configured to monitor any one or more of a compressed air demand, a heat/cold demand, and an electricity demand to optimize the flow of compressed air and distribute the air flow accordingly in order to provide a particular service to satisfy the demand.

The system can use the stored compressed air directly in manufacturing applications. This may reduce the loss of conversion in the system while providing demand management.

The term "compressed air" as used herein (also referred to as "pressurized air") is understood to describe air kept under a pressure that is greater than atmospheric pressure.

As used herein, the term "between", when used in reference to a range of values such as a pressure range, or when a range of values is provided means the range inclusive of the lower limit value and upper limit value, unless otherwise stated. For example, a pressure range of "4 to 70 MPa" or "between 4 MPa and 70 MPa" is taken to include pressure values of 4.0 MPa and 70.0 MPa.

Referring now to FIG. 1, shown therein is a system 100 for compressed air energy storage, according to an embodiment. The system 100 provides combined heat and power.

The system 100 can store heat created from compression of air during a storage process for use later in a generation process (e.g. an electricity generation section of the cycle).

The system 100 operates at a site 102. The site 102 includes a facility for receiving an output of the system 100. The energy needs and demands of the facility can be managed using the system 100.

The facility at the site 102 may include one or more facilities or buildings. The facility may be a large industrial or commercial facility. The facility may be a factory, a hospital, a university campus, a data center, a manufacturing facility (e.g. automotive manufacturing), or a large commercial complex (e.g. a mall). The facility may be a building, such as a data center, which may consume significant amounts of energy (e.g. electricity), generate significant amounts of energy (e.g. heat), or that requires, uses, or could benefit from cooling services. The type and nature of the facility may determine how the system 100, including demand management, is configured.

The system 100 may manage, significantly reduce, and increase flexibility of electricity demand and energy intensity of the facility.

The system 100 can be designed to work with an on-site generation unit. The on-site generation unit may be a natural gas CHP system. The system 100 may work with the generation unit to significantly improve overall efficiency of the generation unit by utilizing waste heat in the a microturbine 114 to generate electricity.

Depending on the direction and magnitude of energy or heat required, the system 100 can bring onboard or disable certain hardware to optimize the energy balance in the system 100.

The facility may have a demand range between 1-5 MW.

The system 100 includes a mechanical and thermal storage unit 104.

The storage unit 104 is configured to store high-pressure hot air. The air stored by the storage unit 104 may have a pressure range of 4-70 MPa. In an embodiment, the storage unit 104 may have an operating pressure range between 20 MPa to 55 MPA. The temperature of the stored air depends on the pressure and volume of the compressed air. If the process is assumed isothermal, the temperature will be ambient or close to ambient.

The mechanical and thermal storage unit 104 may be located under or above ground.

Embodiments having the storage unit 104 located above ground may be preferred in cases where lower pressure storage is required.

In underground embodiments, the storage unit 104 may be located in a borehole, well, cavern, or the like.

In embodiments using a borehole, the borehole is located underground. The borehole can be located almost anywhere. Geomechanical analysis can be used to identify a preferred location and to determine the pressure range that the borehole can withstand. The flexibility in location for the borehole is one particular advantage of borehole embodiments of the system 100 and storage unit 104.

The borehole may include a thermal insulation layer facing the inside (cavity) of the borehole. The thermal insulation layer may be soil-based or rock-based.

The choice of casing may depend on the type of material available onsite and the operating pressure and temperature for which each unit is designed. Casing options may be selected based on thermal conductivity properties and rigidity (reaction to pressure).

The low conductivity of the borehole interior (e.g. soil) may reduce a need to dissipate heat generated during the air compression process, making the process close to Adiabatic and Isentropic.

The depth of the borehole may depend on specific geomechanics and power requirements of the site 102. The depth is a function of the required air volume in order to reach the intended energy density of the energy storage system 100. The depth of the borehole may be in the magnitude of kilometers.

The mechanical and thermal storage unit 104 includes a thermal energy storage ("TES") 106 and an air storage 108. The TES 106 and the air storage 108 are fluidly connected to each other.

The TES 106 stores heat 110. The heat 110 is generated during an air compression process performed by the system 100.

The TES 106 may be implemented as an underground thermal energy storage ("UTES") using ground as storage medium, phase change storage ("PCS"), thermo chemical storage ("TCS"), or cool thermal energy storage ("CTES").

The TES 106 characteristics are determined based on the intended energy density and the required HVAC loads.

The air storage 108 includes a pressure vessel 112 for storing pressurized air 114 generated by the system 100.

The pressurized air 114 may have a pressure range of 1000-10000 psi. Other properties of the pressurized air 114 depend on volume.

The pressurized air 114 may be high pressure, hot air. The pressurized 114 air may have a pressure in the range of 4-70 MPa and a temperature of up to 650° C. The pressure vessel 112 may be an air storage tank.

The pressure vessel 112 may comprise an outer casing enclosing an inner compartment for storing the pressurized air 114. The casing may be composed of a thermally insulating material.

An above-ground embodiment of the pressure vessel 112 may be made from high-strength steel or composite. High-strength steel may be defined as defined as steel that has yield strength ranging between 210-550 MPa and a tensile strength 270 to 700 MPa.

An underground embodiment of the pressure vessel 112 may be a borehole, drilled or otherwise made into ground, with casing (e.g. soil, steel alloy, concrete). The size range may be 50-1000 m$^3$. The material used for casing and the layers may be designed to have low thermal conductivity.

The system 100 also includes a fluid transportation subsystem 116. The fluid transportation subsystem 116 transports fluids (e.g. working energy fluid, hot and cold air, compressed air), such as the pressurized air 114, throughout the system 100 including to and from various system components.

The fluid transportation subsystem 116 includes a plurality of fluid conduits 118. The fluid conduits 118 fluidly connect system components such that the compressed air 114 and other fluid components can be transported throughout the system 100.

The fluid transportation subsystem 116 also includes valves 120. The valves 120 may include any one or more of pressure valves, flow valves, and throttling valves. The valves 120 operate to control the flow rate of fluids through the fluid conduits 118. In some cases, the valves 120 may form a valve or flow control subsystem for controlling flow in the system. The flow control subsystem can be controlled by one or more computer components of the system (e.g. energy management unit 144, described below), which may include making determinations on which valves 120 to open or close in order to promote flow to a particular system component or destination to achieve a particular result (e.g. open a valve to absorb heat from environment into a fluid conduit 118).

The fluid connections between system components provided by the fluid transportation subsystem 116 are denoted by solid arrows in FIG. 1.

The system 100 also includes a thermomechanical-electrical conversion subsystem 122.

The thermomechanical-electrical conversion subsystem 122 is configured to generate thermomechanical energy from electrical energy and electrical energy from thermomechanical energy. The conversion subsystem 122 is fluidly connected to the storage unit 104 via the fluid transportation subsystem 116.

The conversion subsystem 122 includes a storage subsystem 124 and a generation subsystem 126.

The storage subsystem 124 compresses ambient air to generate hot, pressurized air 114. The pressurized air 114 is stored in the pressure vessel 112.

In an embodiment, the storage subsystem 124 includes a compressor 128 and a heat exchanger 130.

The compressor 128 is fluidly connected to the air storage 108 via the fluid transportation subsystem 116 such that compressed air 114 generated by the compressor 128 can be provided to and stored in the pressure vessel 112.

The heat exchanger 130 is fluidly connected to the thermal energy storage 106 via the flow transportation subsystem 116.

The storage subsystem 124 is configured to receive storage process inputs. The storage subsystem 124 uses the storage process inputs to generate compressed air 114 and heat 110, which can be stored by the compressed air storage 108 and thermal energy storage 106, respectively.

The storage process inputs include ambient air and power. The ambient air and power are used by the compressor 128 to generate the compressed air 114, which can be transported via the fluid transportation system 116 for storage in the compressed air storage 108.

The storage subsystem 124 is configured to generate storage process outputs. The storage process outputs include the pressurized air 114 and heat 110. The storage process outputs can be stored by the compressed air storage 108 and thermal energy storage 106 for later use by the system 100.

The generation subsystem 126 generates electricity using the compressed air 114 from the compressed air storage 112.

The generation subsystem 126 includes a heat exchanger 132 and a turbine generator 134.

The turbine 134 may be a microturbine. The microturbine may be a compact form of a conventional gas turbine which may have a capacity range of 250 KW to 25 MW.

The generation subsystem 126 is configured to receive generation process inputs, which are used by the generation subsystem 126 to generate generation process outputs. The generation process inputs include heat 110 and compressed air 114. Using the heat 110 and compressed air 114, the generation subsystem 126 generates generation process outputs including electricity that can be used by the facility at the site 102.

The electricity can be delivered from the generation subsystem 126 to an end-use device for consumption.

The system 100 also includes an HVAC subsystem 136 and a pneumatic subsystem 138.

The HVAC system 136 includes an HVAC unit 140. The pneumatic subsystem 138 includes a pneumatic end-use device 142.

The HVAC subsystem 136 and pneumatic subsystem 138 are fluidly connected to other system components, such as the conversion subsystem 122 and the storage unit 104 via the fluid transportation subsystem 116.

The HVAC subsystem 136 provides cooling and heating services to the facility. The HVAC subsystem 136 can provide the cooling and heating services by interacting with the storage unit 104 and conversion subsystem 122. For example, the quantity of heat 110 flowing to the TES 106 may be adjusted to add or remove heat to or from the environment of the facility to provide a heating service or cooling service, respectively.

During warmer months of the year, the system 100 may implement a generation process via the generation subsystem 126 to reduce demand on the HVAC subsystem 136, as the expansion of the pressurized air 114 can result in a drop in temperature. Conversely, during the cooler months of the year, the system 100 can use heat 110 generated during the compression process (i.e. by storage subsystem 124) to heat the facility (e.g. preheat the facility in the early hours of the day).

The pneumatic subsystem 138 provides pneumatic (or compressed air) services to the facility. In particular, the pneumatic subsystem 138 can provide the compressed air 114 to pneumatic end-use device 142. The pneumatic end-use device 142 can use the compressed air 114 to power the end-use device 142. For example, the end-use device 142 may be an air tool or the like that uses compressed air to operate. The provision of pneumatic services may include transporting the compressed air 114 from the pressure vessel 112 to the pneumatic end-use device 142 via the fluid transportation subsystem 116 in a manner that bypasses the generation subsystem 126 (which may, under normal circumstances, use the compressed air 114 to generate power).

The compressed air 114 can be used directly in manufacturing applications, which can reduce the loss of conversion in the system 100 while providing demand management. For example, the heat generated during air compression in facilities is normally wasted (dissipated). Advantageously, the system 100 can capture and store this heat (e.g. heat 110) in the TES 106. As a result, the system 100 can increase, in some cases significantly, the conversion efficiency and reduce the energy losses in the compression process.

The system 100 also includes an energy management unit 144. The energy management unit 144 manages the operation of the components of system 100.

The energy management unit 144 is communicatively connected to the storage unit 104, conversion subsystem 122, fluid transportation subsystem 116, HVAC subsystem 136, and pneumatic subsystem 138 via a network. The network may be a LAN or a WAN and may include wireless or wired components.

Data communications between the energy management unit 144 and components 104, 122, 116, 136, and 138 are denoted in FIG. 1 by dashed lines.

The energy management unit 144 is configured to analyze system data and determine an optimum output for the system 100. The optimum output may include flow parameters and component configurations. The optimum output may be one that reduces power demand for the facility and/or reduces waste energy. The optimum output includes system parameters and configurations that consider and utilize the flow and operation of other system components.

The energy management unit 144 includes a computing device 146 (or energy management device), sensors 148, and control equipment 150. The computing device 146 runs software 152 comprising instructions for managing and controlling the operation of system 100 and its components, such as described herein. The control equipment 150 includes one or more control devices.

The computing device 146 may be a single computing device, such as a server, or a plurality of computing devices. The computing device 146 may be located at the site 102 or at another location. In some cases, the computing device 146 may include onsite and offsite components in communication with one another. For example, the computing device 146 may include a remote or cloud server in communication with one or more onsite components.

The computing device 146 is communicatively connected to the sensors 148 and the control equipment 150 via a network. The network may be a LAN or WAN. The network may include wired or wireless components.

The sensors 148 are configured to acquire sensor data. The sensor data is transmitted by the sensors 148 to the computing device 146, where the sensor data can be analyzed via the software 152 to determine how the system 100 should operate, including how air and other fluid components should flow through the system 100. The sensor data may include any one or more of power sensor data, HVAC sensor data, and pneumatic sensor data. The sensors 148 may be positioned around the site 102, including at or in any one or more of system components 104, 122, 116, 136, and 138. The sensors 148 continuously monitor inflow and outflow of heat 110 and energy (e.g. electricity-compressed air).

The software 152 may be configured to receive the sensor data from the sensors 148 (as well as any additional non-sensor data inputs), analyze the received sensor data, and determine an optimized flow and air distribution for the system 100. The optimized flow and air distribution can be stored as system control data at the computing device 146. The software 152 can communicate, via the computing device 146, determined control instructions to the control equipment 150.

The computing device 146 stores system optimization rules in a memory. The system optimization rules may be implemented via the software 152. The system optimization rules may be designed to consider reducing energy demand and/or waste energy. Certain data received or stored by the computing device 146 may be analyzed by the software 152 in light of the system optimization rules. Such data may include, for example, sensor data and service demand data (e.g. power service demand data, thermal energy demand data, etc.). Sensor data may include data indicating how much compressed air and heat are stored in the pressure vessel 112 and TES 106, respectively. Service demand data may indicate a demand level for a particular energy service (e.g. power/electricity, thermal energy, pneumatic energy) at the facility. This may include demand from end-use units such as air treatment units, tools or systems powered by compressed air, process heating units, and devices powered by electricity.

The control equipment 150 is configured to receive the system control data and perform a control operation according to the received system control data. The system control data may include or encode instructions to be carried out by the control equipment 150. For example, the control equipment 150 may activate (e.g. bring online) or inactivate (e.g. disable) certain components based on received system control data. The control equipment 150 is configured to adjust the flow of fluid components in the system, for example by controlling the fluid transportation subsystem 116 via the valves 120. Depending on the nature of the received system control data, the control equipment 150 may alter flow to or from TES 106 or air storage 108, for example, via controlling valves 120 of the fluid transportation system 116.

In some cases, the system control data generated by the software 152 and provided to the control equipment 150 may instruct the control equipment 150 to initiate or stop a process, such as a storage or generation process of the conversion subsystem 122, or activate or inactivate a component such as the compressor 128 or turbine 134.

The system 100 can provide valuable services for commercial electricity for end users. The services include electrical energy, which can be used during peak times, thermal energy, which can be used for the conditioning of the facility environment (cooling and heating), and compressed air, which can be used by air-powered equipment. The thermal energy service capability and compressed air service capability of the system 100 provide advancement over existing CAES systems. The ability of the system 100 to provide electrical energy, thermal energy, and compressed air service capabilities provides advancement over other energy storage technologies.

The energy management unit 144 may be configured to maximize round-trip efficiency by intelligently managing the inflow and outflow of energy in all formats (e.g. electricity, thermal, compressed air), which may increase total energy utilization. The energy management unit 144 may also optimize the operation of the energy storage system 100 and its integration with the electrical grid and existing air-generation and HVAC systems at the facility.

Figure 2:
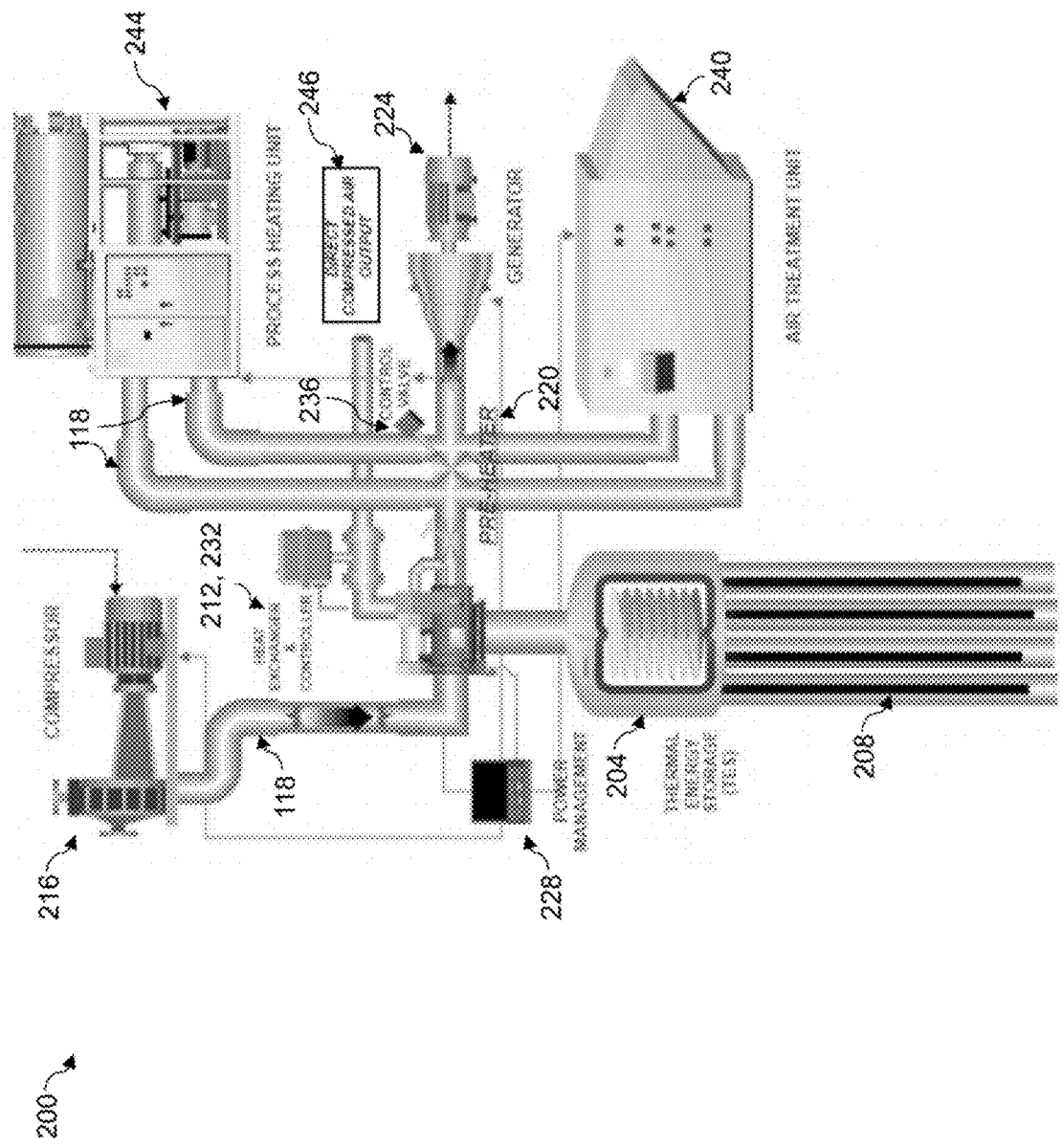
FIG. 2 is a schematic diagram of a CAES system, according to an embodiment.

Referring now to FIG. 2, shown therein is a schematic of an embodiment 200 of the CAES system 100 of FIG. 1. The CAES system 200 represents one possible embodiment of system 100 of FIG. 1.

The mechanical and thermal storage unit 104 of CAES system 200 includes thermal energy storage (TES) 204 and pressure vessel 208.

The thermomechanical-electrical conversion system 122 of the CAES system 200 includes heat exchanger 212, compressor 216, pre-heater 220, and generator 224.

The compressor 216 can receive ambient air and power and generate compressed air 114. The compressor 216 may include an integrated heat exchanger which may channel heat into the energy flow system (e.g. into air flow lines of the system, such as fluid conduit 118) instead of dissipating the heat.

The heat exchanger 212 captures heat 110 generated from the compression process performed by the compressor 216. The heat 110 is transferred via the fluid transportation subsystem 116 to the TES 204, where the heat 110 is stored for later use. The heat exchangers for the energy conversion unit are integrated into the TES unit 204 and are located between the compressor 216, preheater 220, and pressure vessel 208.

The pre-heater 220 preheats pressurized air 114 that has been released from air storage 208 prior to the air being provided to the generator 224. In doing so, the system 200 can avoid using gas to preheat the air for the generation process. The control valve unit 236 is part of preheater 220 and is positioned between process heating unit 244, direct compressed air output 246, generator 224, and air treatment unit 240 to control the flow of heat from these units to the fluid (air). The preheater 220 is also a heat exchanger that is placed between the air treatment unit 240, generator 224, direct compressed air output 246, and process heating unit 244.

The generator 224 receives the preheated pressurized air 114 and generates electricity from the preheated, pressurized air 114. The generator 224 may have its own integrated heat exchanger that is necessary for its function. However, instead of dissipating the heat, it is channeled into the energy flow system (mainly the air flow lines, e.g. 118).

The energy management unit 144 of CAES system 200 includes power management device 228, controller 232, control valve 236, as well as software 152 (not shown) configured to run on power management device 228 and operate control equipment such as controller 232 and control valve 236 in order to control flow in the system 200 and storage and generation of energy. The controller 232 controls the flow of air and the heat exchange between TES 204 (and, by extension, pressure vessel 208), compressor 216, and preheater 220. Control valve 236 is part of the preheater unit 220 to control the heat and air flow between process heating unit 244, direct compressed air output 246, generator 224, and air treatment unit 240. Control valve 236 distributes heat and air within these units based on the commands received from power management device 228 to optimize the output and total energy efficiency.

The system 200 also includes an air treatment unit 240. The air treatment unit 240, also known as an air handling unit ("AHU"), is the integration point with the existing HVAC system in the facility. The air treatment unit 240 aims to capture and store the waste heat of the facility in the TES 204, or treat the air for air-conditioning purposes. The air treatment unit 240 may operate as an air handler to regulate and circulate air as part of a heating, ventilating, and air-conditioning system. The air treatment unit 240 may be a large metal box containing a blower, heating or cooling elements, filter racks or chambers, sound attenuators, and dampers. The air treatment unit 240 may connect to a ductwork ventilation system at the facility that distributes the conditioned air through the facility and returns it to the air treatment unit 240. In some cases, the air treatment unit 240 may discharge (supply) and admit (return) air directly to and from the space served by the unit 240 without ductwork. The air treatment unit 240 may have its own integrated heat exchanger that is necessary for its function. However, instead of dissipating the heat, it is channeled into the energy flow system (mainly the air flow lines, e.g. 118).

The system 200 also includes a process heating unit 244. The process heating unit 244 represents functions or equipment within a given facility that use or produce heat as part of their process (e.g. ovens). The process heating unit 244 interacts with the rest of the system 200 by the way of preheater 220 and control valve 236. Depending on the availability and requirement at any point during the operation, excess heat from the processes of the process heating unit 244 can be captured by the system 100 and utilized for a heating function in another unit, or the excess heat from other functions may be captured by the system 100 and used to reduce the thermal energy needed in the processes of process heating unit 244. For example, the system 200 may direct the flow of heat to and from the TES 208 to either store excess heat from the process heating unit 244 or deliver heat (captured elsewhere by the system) to the process heating unit 244. Flow determinations can be made by the power management unit 228. Process heating unit 244 may include its own integrated heat exchanger that is necessary for its function. However, instead of dissipating the heat, the heat is channeled into the energy flow system (mainly the air flow lines, e.g. 118).

The system 200 can provide a direct compressed air output 246 from the fluid transportation subsystem 116. The direct compressed air output 246 includes pressurized air 114 from the pressure vessel 112 that is discharged and bypasses the generation subsystem 126 so that the pressurized air 114 can be used by the pneumatic subsystem 138, and in particular the pneumatic end-use unit 142.

The fluid conduits 118 of the fluid transportation subsystem 116 fluidly connect the compressor 216, heat exchanger 212, thermal energy storage 204, pressure vessel 208, preheater 220, generator 224, process heating unit 244, air treatment unit 240, and end use device 142 (not shown in FIG. 2) that receives the direct compressed air output 246.

Figure 3:
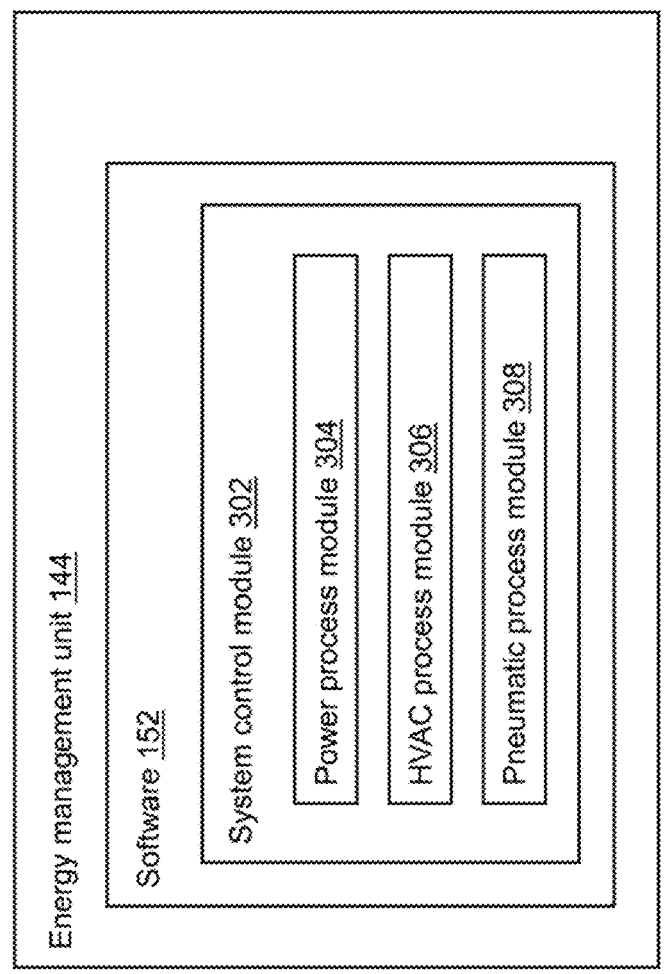
FIG. 3 is a block diagram of software components of the energy management unit 144 of FIG. 1, according to an embodiment.

Referring now to FIG. 3, shown therein is a block diagram of software components 300 for use in a CAES system such as system 100 of FIG. 1, according to an embodiment.

The software components 300 may be software components of software 152 of FIG. 1. The software components 300 may be implemented as one or more software modules that, when executed by an executing device (e.g. computing device 146 of FIG. 1), cause the executing device to perform the actions, functions, and operations described herein.

As described in reference to FIG. 1, energy management unit 144 includes software 152. Generally, the software 152 may control, in cooperation with other components of the energy management unit 144, the management of energy in the system 100. The management of energy includes the storage and use of compressed air 114, such as to generate power for use by the facility, and the control of air flow throughout the system 100 to achieve the desired operation.

The software 152 includes a system control module 302. Generally, the system control module 302 determines and controls the flow of air throughout the system 100. By determining and controlling the flow of air, the system control module 302 can control and manage how the air is used, including how and when compressed air 114 is stored and discharged and what output is generated from the discharge of the compressed air 114.

The system control module 302 receives sensor data from sensors 148 and analyzes the received data to determine system output control data.

The system control module 302 detects a type and amount of energy used by primarily end-use units at the facility and utilizes the flow and operation of components of the system 100 for optimum output. The system 100 may provide three main services for the facility at the site 102 including electricity, heating/cooling, and compressed air. As a result, the system 100, for example via the energy management unit 144, continuously monitors the balance of the three services in the facility. The system 100 can store the service outputs in the system 100 or provide the service outputs to the facility based on a shortage or excess of each service output. As the system 100 manages the balance of electricity, HVAC load, and compressed air in the whole facility, the output can be optimized by the system 100 in order to minimize energy costs and reduce total energy loss (utilization) while also ensuring reliable and continuous operation of the facility. The system control module 302 may reduce power demand and reduce waste energy. The system control module 302 monitors demand for compressed air, heating/cooling, and electricity to optimize flow and distribute air flow accordingly.

The system control module 302 may instruct and control system 100 components to compress air during off-peak hours.

The system control module 302 may instruct and control generation of onsite electricity from compressed air to reduce demand. The system control module 302 may do so by generating electricity during facility operating hours.

The system control module 302 may reduce loss of conversion in the system 100 and provide demand management.

The system control module 302 receives and analyzes data related to the inflow and outflow of heat and energy.

The system control module 302 includes a power process module 304, an HVAC process module 306, and a pneumatic process module 308. In variations, the system control module 302 may include any one or more of modules 304, 306, 308 depending on the types of services the system 100 is configured to provide.

The power process module 304 implements a power process (e.g. process 500 of FIG. 5, below). The power process module 304 controls the operation of the power subsystem including the mechanical and thermal storage unit 104 and the thermomechanical-electrical conversion subsystem 122, as well as the fluid transportation subsystem 116 responsible for transporting air flow throughout the power subsystem.

The HVAC process module 306 implements an HVAC process (e.g. process 600 of FIG. 6, below). The HVAC process module 306 can implement a cooling or heating process for provision of cooling and heating services to the facility, respectively. The HVAC process module 306 determines how the HVAC subsystem 136 interacts with the power subsystem.

In particular, the HVAC process module 306 may be configured to identify opportunities for engaging with the storage and generation processes of the power subsystem in order to operate the system 100 most efficiently. One such example is the storage or use of compressed air 114 in order to lower or raise the temperature of the environment of the facility.

Figure 7:
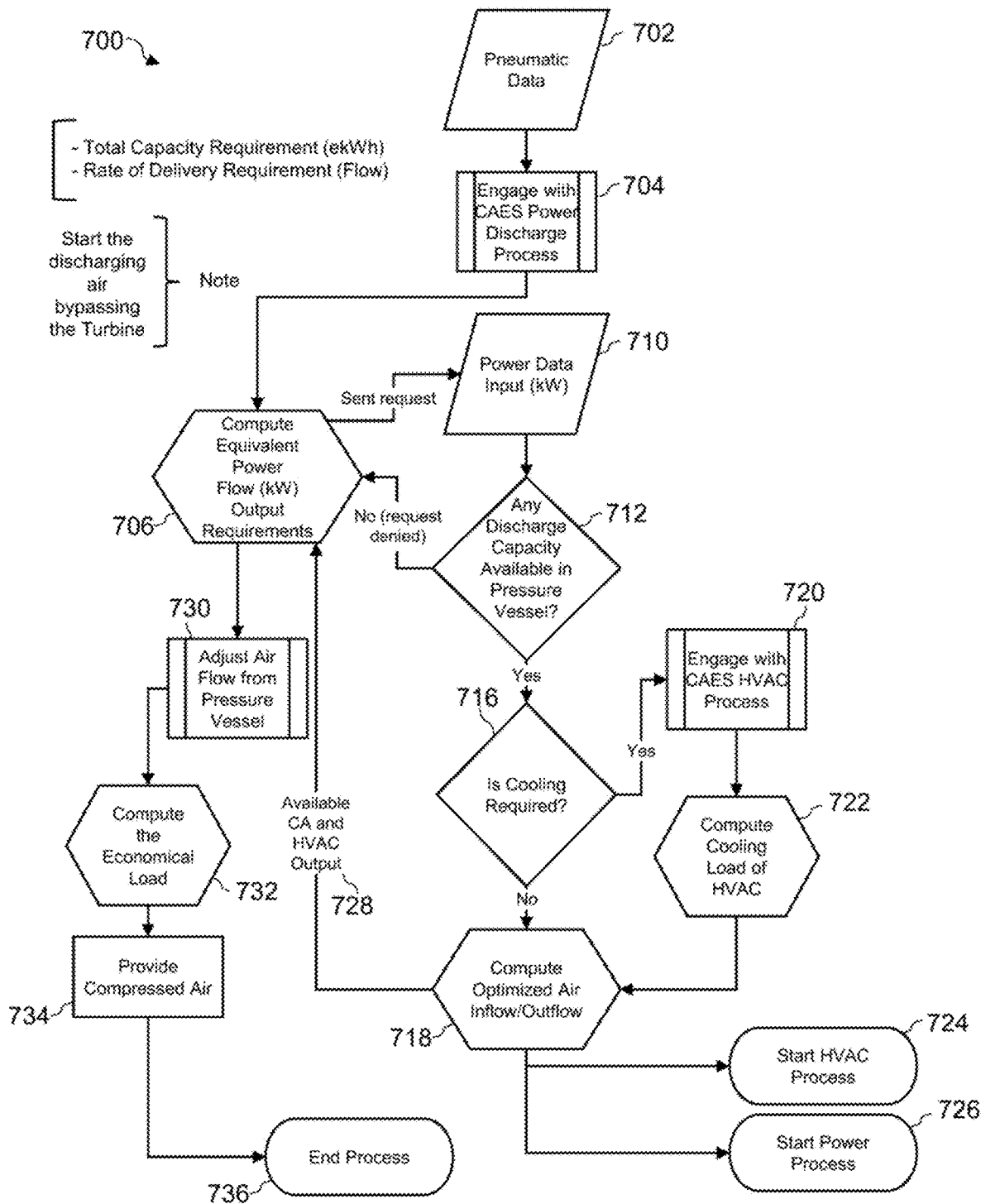
FIG. 7 is a flow diagram of a process flow for a pneumatic process implemented by a CAES system, according to an embodiment.

The pneumatic process module 308 implements a pneumatic process (e.g. process 700 of FIG. 7). The pneumatic process module 308 may control the provision of pneumatic services to the facility via the pneumatic subsystem 138. The pneumatic process module 308 determines how the pneumatic subsystem 138 interacts with the power subsystem.

In particular, the pneumatic process module 308 may be configured to identify opportunities for engaging with the generation process of the power subsystem (i.e. the discharge of compressed air 114 from air storage 108) in order to operate the system more efficiently. In an example, the pneumatic process module 308 may engage the power subsystem and use compressed air discharged from air storage directly as input to end-use devices 142 that use compressed air (e.g. air tools in manufacturing).

Figure 4:
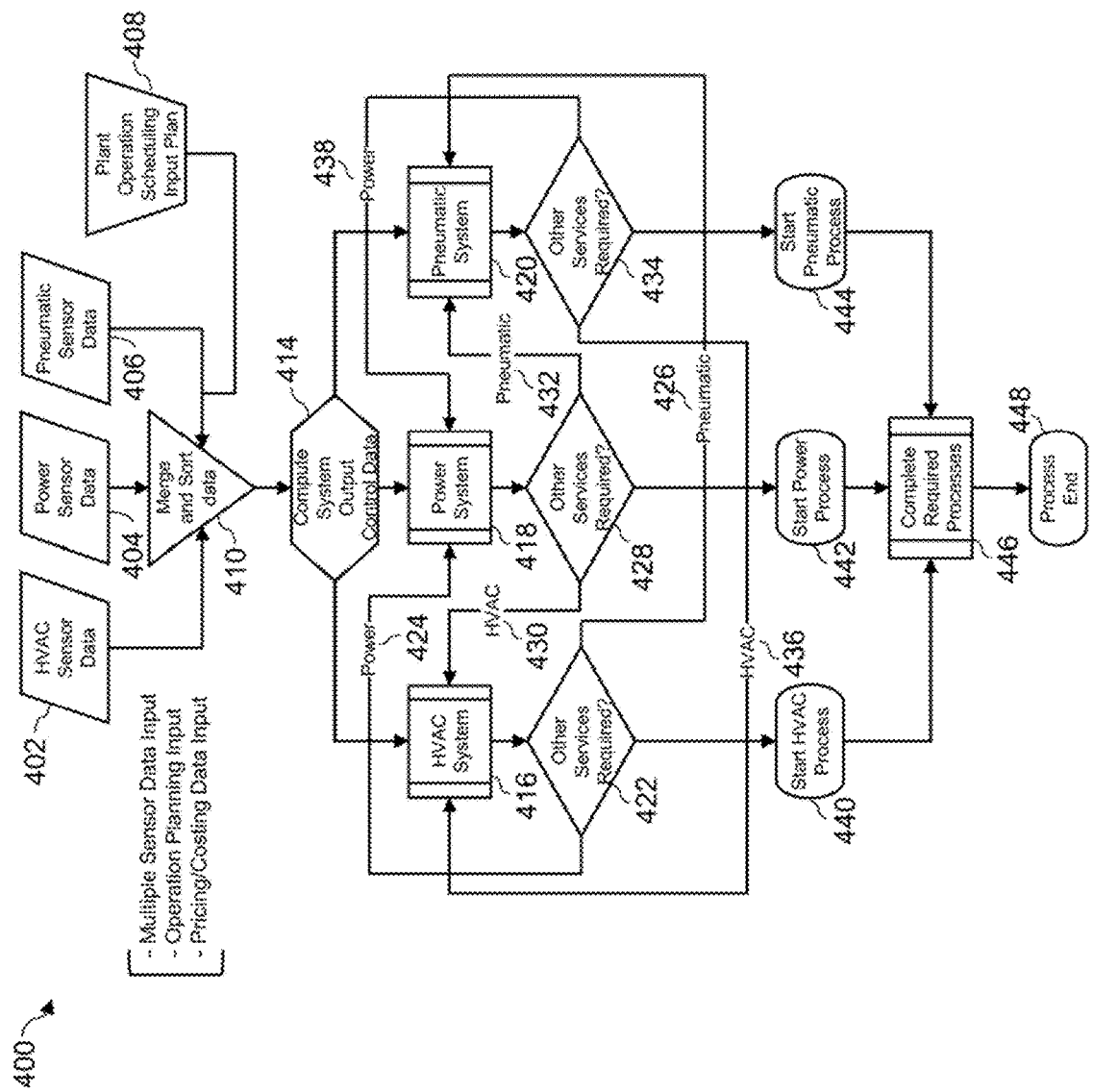
FIG. 4 is a flow diagram of a controller logic implemented by the energy management unit 144 of FIG. 1, according to an embodiment.

Referring now to FIG. 4, shown therein is a flow diagram of a controller logic process flow 400, according to an embodiment. The process flow 400 may be implemented by the energy management unit 144 of FIG. 1, for example by software 152.

Generally, the process flow 400 can be used to control the operation of and interaction between the various subsystems of the CAES system 100, including a power subsystem, an HVAC subsystem, and a pneumatic subsystem. In variations, the system 100 may include only one or two of these subsystems. In such variations, the process flow 400 can be adjusted accordingly to control the operation of and interaction between the applicable subsystem or subsystems.

The process flow 400 includes a plurality of data inputs including HVAC sensor data 402, power sensor data 404, and pneumatic sensor data 406. The sensor data 402, 404, 406 The data inputs also include operation planning input data 408 (e.g. plant operation scheduling input plan) and a pricing/costing data input (not shown). The operation planning input data 408 may include, for example, any one or more of a production schedule, an air-conditioning schedule, facility operation hours, and each energy carriers cost factors and structure (e.g. time of use).

The sensor data inputs 402, 404, 406 may be received from sensors 148 of the respective subsystems (e.g. HVAC sensor data 402 received from HVAC subsystem sensors) and stored in memory of the computer device 146. The operation planning input data 408 and pricing data input are also stored in memory.

At 410, the data inputs 402, 404, 406, 408 are merged and sorted. The merging and sorting may be performed by a data merging and sorting module implemented by the software 152. The merging and sorting 410 generates merged and sorted data. The merged and sorted data is stored in memory.

At 414, system output control data is computed from the merged and sorted data. The system output control data may be computed via a decision-making unit which is a component of the software 152 (e.g. system control module 302). The decision-making unit is configured to determine an optimized output of the system 100 based on the input data coming from data merging and sorting module of 410. The decision-making unit commands and controls power, pneumatic and HVAC units in the system 100. The system output control data is computed by the energy management unit 144 and stored in memory.

The system output control data is transmitted and provided as input to an HVAC subsystem 416, a power subsystem 418, and a pneumatic subsystem 420. Each of the subsystems 416, 418, 420 receives a subset of commands (i.e. system output control data) that is associated with that specific subsystem. In other embodiments, the system 100 may be designed such that one or more of subsystems 416, 418, 420 receives the complete system control output data (as opposed to a subset relevant to the subsystem). For each of subsystems 416, 418, 420, the system output control data may be received by a control component or computing device of the subsystem in communication with one or more physical components of the subsystem such that the actions and operation of the subsystem can be controlled according to the system output control data. The receiving control component may be located at or in close proximity to the controlled physical components of the subsystem.

Each of the subsystems 416, 418, and 420 are configured to provide subsystem services. The subsystem services can be used by the facility. For example, the HVAC subsystem 416 can provide heating services and cooling services, the power subsystem 418 can provide electricity services, and the pneumatic subsystem 420 can provide pneumatic or compressed air services. In some cases, as described below, subsystem services of a first subsystem may be required or used to provide subsystem services of a second subsystem. In an example, the HVAC subsystem 416 may, based on the system output control data at 414, be required to provide a heating service. To provide the heating service, the HVAC subsystem 416 may require the services of another subsystem, such as the power subsystem 418, and may engage the power subsystem services to do so.

At 422, based on the received system output control data from 414, a determination is made as to whether other services, such as power services or pneumatic services, are required by the HVAC subsystem 416. FIG. 4 describes the logical process of the energy management unit 144, which may include analysis and decisions made based on the total data input from all units and the operational requirement of the facility/site. The decision tree may be configured to respond to the input from all sensors 148 on a continuous basis. These sensors 148 may indicate what types of service is require at any particular point in time and the availability of resources.

The other services required determination at 422 is performed by the software 152 of the energy management unit 144. Decision-making algorithms embedded within the software 152 are configured to determine whether additional services are required based on the input from the integrated sensors of the control units.

If it is determined that a power subsystem service is required, at 424 the HVAC system 416 can engage the power subsystem 418. The power subsystem 418 can then provide the required services.

If it is determined that a pneumatic subsystem service is required, at 426 the HVAC system 416 can engage the pneumatic subsystem 420. The pneumatic subsystem 420 can then provide the required services.

At 428, based on the received system output control data from 414, a determination is made as to whether other services, such as HVAC services or pneumatic services, are required by the power subsystem 418. FIG. 4 describes the logical process of the energy management unit 144, which may include analysis and decisions made based on the total data input from all units and the operational requirement of the facility/site. The decision tree may be configured to respond to the input from all sensors 148 on a continuous basis. The sensors 148 indicate what types of service is required at any particular point in time and the availability of resources. The type of service required may depend on the needs of the facility which can be compressed air, heating/cooling, and/or electricity.

The other services required determination 428 may be performed by the computing device 146 or a controller component of the power subsystem 418.

If it is determined at 428 that an HVAC subsystem service is required, at 430 the power subsystem 418 can engage the HVAC subsystem 416. The HVAC subsystem 416 can then provide the required services.

If it determined at 428 that a pneumatic subsystem service is required, at 432 the power subsystem 418 can engage the pneumatic subsystem 420. The pneumatic subsystem 420 can then provide the required services.

At 434, based on the received system output control data from 414, a determination is made as to whether other services, such as HVAC services or power services, are required by the pneumatic subsystem 420. FIG. 4 describes the logical process of the energy management unit 144, which may include analysis and decisions made based on the total data input from all units and the operational requirement of the facility/site. The decision tree may be configured to respond to the input from all sensors 148 on a continuous basis. The sensors 148 indicate what types of service is required at any particular point in time and the availability of resources. The type of service required may depend on the needs of the facility which can be compressed air, heating/cooling, and/or electricity.

The other services required determination 434 may be performed by the computing device 146 or a controller component of the pneumatic subsystem 420.

If it is determined at 434 that an HVAC subsystem service is required, at 436 the pneumatic subsystem 420 can engage the HVAC subsystem 416. The HVAC subsystem 416 can then provide the required services.

If it is determined at 434 that a power subsystem service is required, at 438 the pneumatic subsystem 420 can engage the power subsystem 418. The power subsystem 418 can then provide the required services.

At 440, an HVAC process is initiated. The performance of the HVAC process is based on the system output control data 414 and the determination 422.

The HVAC process 440 includes the provision of cooling or heating for the facility. The HVAC process 440 may engage with the power discharge or power charge process of the power process 442. Engaging the power process 442 can allow for the use of the charge (storage) process or discharge (generation) process to introduce or remove heat from the environment of the facility.

At 442, a power process is initiated. The performance of the power process is based on the system output control data 414 and the determination 428.

The power process 442 includes storage of energy as compressed air 114 and generation of electricity from the stored compressed air 114. The electricity can be used by the facility.

At 444, a pneumatic process is initiated. The performance of the pneumatic process is based on the system output control data 414 and the determination 434.

The pneumatic process 444 includes providing compressed air to end use units that consume or use compressed air in their operation (e.g. manufacturing applications, tools). The pneumatic process 444 may engage with power process 442, such as to use compressed air 114 released from compressed air storage 108 as a compressed air input to a compressed air-powered end unit. The pneumatic process 444 may include the discharge of the compressed air and bypassing the generation subsystem of the power subsystem where, during the power process, the compressed air is provided as input to the turbine generator to generate power output.

At 446, the required processes 440, 442, 444 are performed and completed.

At 448, the process flow 400 ends.

Figure 5:
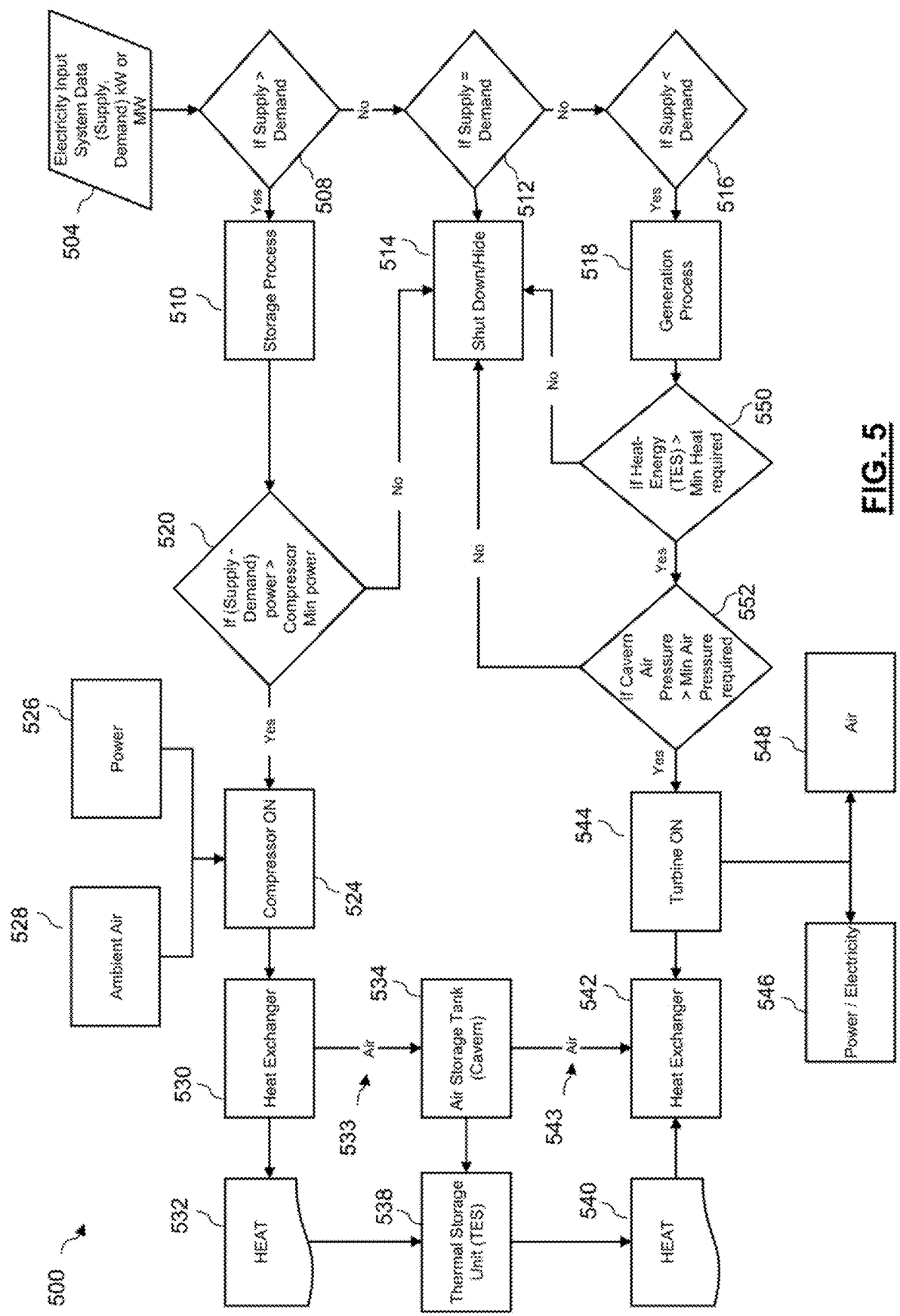
FIG. 5 is a flow diagram of a process flow for a power process implemented by a CAES system, according to an embodiment.

Referring now to FIG. 5, shown therein is a process flow 500 for a power process implemented by a CAES system, according to an embodiment. The CAES system may be the CAES system 100 of FIG. 1.

The process flow 500, or portions thereof, may be implemented by the energy management unit 144 of FIG. 1, and in particular, by software 152. The process flow 500 may be implemented as one or more software modules that, when executed, cause the executing device to perform the actions, functions, and operations described by the process flow 500.

The process flow 500 may be the power process 442 of FIG. 4, or a portion thereof. The process flow 500 is performed by the power subsystem 418 based on input from the energy management unit 144. The energy management unit 144 is configured to process data and control actions, operations, and outputs of the physical components of the power subsystem 418 (e.g. storage subsystem 124 and generation subsystem 126).

The power subsystem 418 receives electricity input system data 504, which may be stored in memory of computing device 146. The electricity input system data 504 may be collected from any electricity input system, which may include onsite generation (e.g. solar, wind, etc.). The onsite generation may be an off-grid system or grid-connected system. The electricity input system data 504 may include electricity demand/generation data taken from all the systems in the facility (input and output) and the electricity coming to the facility from any of these sources. The electricity input system data 504 is provided as input to the process flow 500. The electricity input system data 504 may include grid data. The electricity input system data may include any one or more of supply data, demand data, and pricing data. The electricity input system data 504 may include values in kW or MW.

The electricity input system data 504 or subsets thereof may be collected from available public-access databases or specific data services, for example through an exclusive API embedded within the management software 152 of the energy management unit 144. It should be noted that while the term "grid data" may be used, the system 100 is mainly designed to be used in behind the meter energy storage applications. The term "electricity input system data" as used herein simply refers to an electrical demand profile data of the facility in which the systems and methods of the present disclosure are being employed.

The energy management unit 144 uses the electricity input system data 504 to perform a supply-demand determination. The supply-demand determination includes comparing the supply data (i.e. a supply value) and demand data (i.e. demand value). Depending on the outcome of the determination, the energy management unit 144 instructs the power subsystem to perform certain steps of the process flow 500.

At 508, if the supply data is greater than the demand data, the power subsystem 418 initiates a storage process 510. The storage process 510 includes the compression of air and storage of the resulting compressed air for later use in power generation.

At 512, if the supply data is equal to the demand data, the power subsystem 418 initiates a shut down or idle process 514.

At 516, if the supply data is less than the demand data, the power subsystem 418 initiates a generation process 518. The generation process 518 includes the discharge of compressed air from storage and use of the compressed air in power generation.

For the storage process 510, at 520, the energy management unit 144 compares a (supply-demand) power value and a compressor minimum power value.

The (supply-demand) power value and the compressor minimum power value are stored in memory of the energy management unit 144. The energy management unit 144 calculates the (supply-demand) power value using the electricity input system data 504. The compressor minimum power value may correspond to the power required to operate the compressor of the storage subsystem 124 which is used to compress air for storage.

If the (supply-demand) power value is less than or equal to the compressor minimum power value, the energy management unit 144 initiates a shut down or idle process 514 of the power subsystem 418. The basis of this determination by the energy management unit 144 is that there is not enough available excess energy (Power*Duration) to run the compressor. This situation may also happen when neither more compressed-air storage nor power generation is required.

If the (supply-demand) power value is greater than the compressor minimum power value, the power subsystem # turns the compressor on at 524. Turning the compressor 524 on may include the energy management unit 144 sending a signal to the compressor 524 to turn the compressor 524 on.

The active compressor 524 receives power 526 and ambient air 528 as inputs to a compression process. The compressor 524 uses the power 526 to compress the ambient air 528 to generate compressed air 333.

A heat exchanger 530 is used to capture heat 532 generated as a byproduct of the compression process performed by the compressor 524.

The compressed air 533 is transferred to an air storage tank 534 via a fluid transportation subsystem (e.g. fluid transportation subsystem 116 of FIG. 1). The air storage tank may be located underground. In an embodiment, the air storage tank is a cavern. The air storage tank 534 stores the compressed air 533 for later use, such as by the power subsystem 418 (e.g. in generation process 518).

The heat 532 captured by the heat exchanger 530 is passed to a thermal storage unit (TES) at 538. The thermal storage unit 538 stores the heat 532 for later use, such as by the power subsystem 418 in generation process 518.

Referring now to the generation process 518, at 550, the energy management unit 144 compares a heat-energy (TES) value and a minimum heat required value. The heat-energy value and the minimum heat required value are stored by the energy management unit 144 (in memory). The heat-energy (TES) value is the heat stored in the TES. The energy management unit 144 is configured to constantly compare the heat-energy (TES) value with the minimum heat required value in order to decide on the outputs required to keep the system in balance. For example, if the minimum heat required is more than the heat-energy (TES) value, more heat should be generated or captured via waste-heat recovery at the air handling unit (e.g. air treatment unit 240 of FIG. 2). Otherwise, the system may not be able to operate at that point in time.

The heat-energy value may correspond to an amount of heat stored and/or available in the thermal storage unit 538. The heat-energy (TES) value represents the amount of heat energy (e.g. in eKWh) stored in the TES. The heat-energy value data may be acquired and provided to the energy management unit 144 by a sensor 148 of the thermal storage unit 538.

The minimum heat required value may correspond to the minimum amount of heat required to preheat the compressed air 533 prior to inputting the compressed air 533 into the generation subsystem 126 (i.e. the turbine 544 below). The minimum heat required value may correspond to the minimum heat required to increase the temperature of the compressed air prior to its entrance to the turbine to produce electricity without causing freezing due to the temperature drop as a result of air expansion.

If the heat-energy (TES) value is not greater than the minimum heat required value (i.e. less than or equal to), the power subsystem 418 initiates the shutdown/idle process 514.

If the heat-energy (TES) value is greater than the minimum heat required value, the energy management unit 144 performs another determination at 552.

At determination 552, the energy management unit 144 compares a cavern air pressure value and a minimum air pressure required value.

The cavern air pressure value may correspond to the air pressure of the pressurized air 533 stored in the air storage tank 534. The cavern air pressure value represents the steady pressure of the air stored in the storage. The cavern air pressure value data may be acquired and provided to the energy management unit 144 by a pressure sensor 148 of the air storage tank 334.

The minimum air pressure required value may correspond to the minimum air pressure required to operate the turbine generator 544. The minimum air pressure required value represents the compression level or the pressure of air required to meet the intended energy density. The minimum air pressure required value may be stored at the energy management unit 144.

If the cavern air pressure value is not greater than the minimum air pressure required value (i.e. less than or equal to), the system 100 initiates the shutdown/idle process 514.

If the cavern air pressure value is greater than the minimum air pressure required value, the power subsystem 418 continues with the generation process 518 and turns on turbine generator 544.

The turbine 544 receives as input the compressed air 543 from the air storage tank 534. The compressed air 543 is provided from the air storage tank 534 to the turbine 534 via the fluid transportation subsystem 116.

Prior to the turbine 544 receiving the compressed air 543, the compressed air 543 may be preheated using a heat exchanger 542 and heat 540. The heat 540 is provided by the thermal storage unit 538 and is transferred to the heat exchanger 542 using the fluid transportation subsystem 116. The heat exchanger 542 uses the heat 540 to preheat the compressed air 543 form storage tank 534 prior to the compressed air 543 entering the turbine 544. Accordingly, the heat exchanger 542 transfers the preheated compressed air 543 to the turbine 544 via the fluid transportation subsystem 116.

As described, the active turbine 544 receives the preheated compressed air 543 from the heat exchanger 542 and generates power/electricity 546 and air 548. The air 548 is a byproduct that can released to the environment (i.e. low pressure, expanded air on the outflow side of the turbine 544).

The power 546 can be used by a facility, such as a facility at site 102 of FIG. 1, to power various devices and processes. The power 546 can also be used in other processes implemented by the CAES system 100, such as an HVAC process (e.g. HVAC process 600) or a pneumatic process (e.g. pneumatic process 700).

Figure 6:
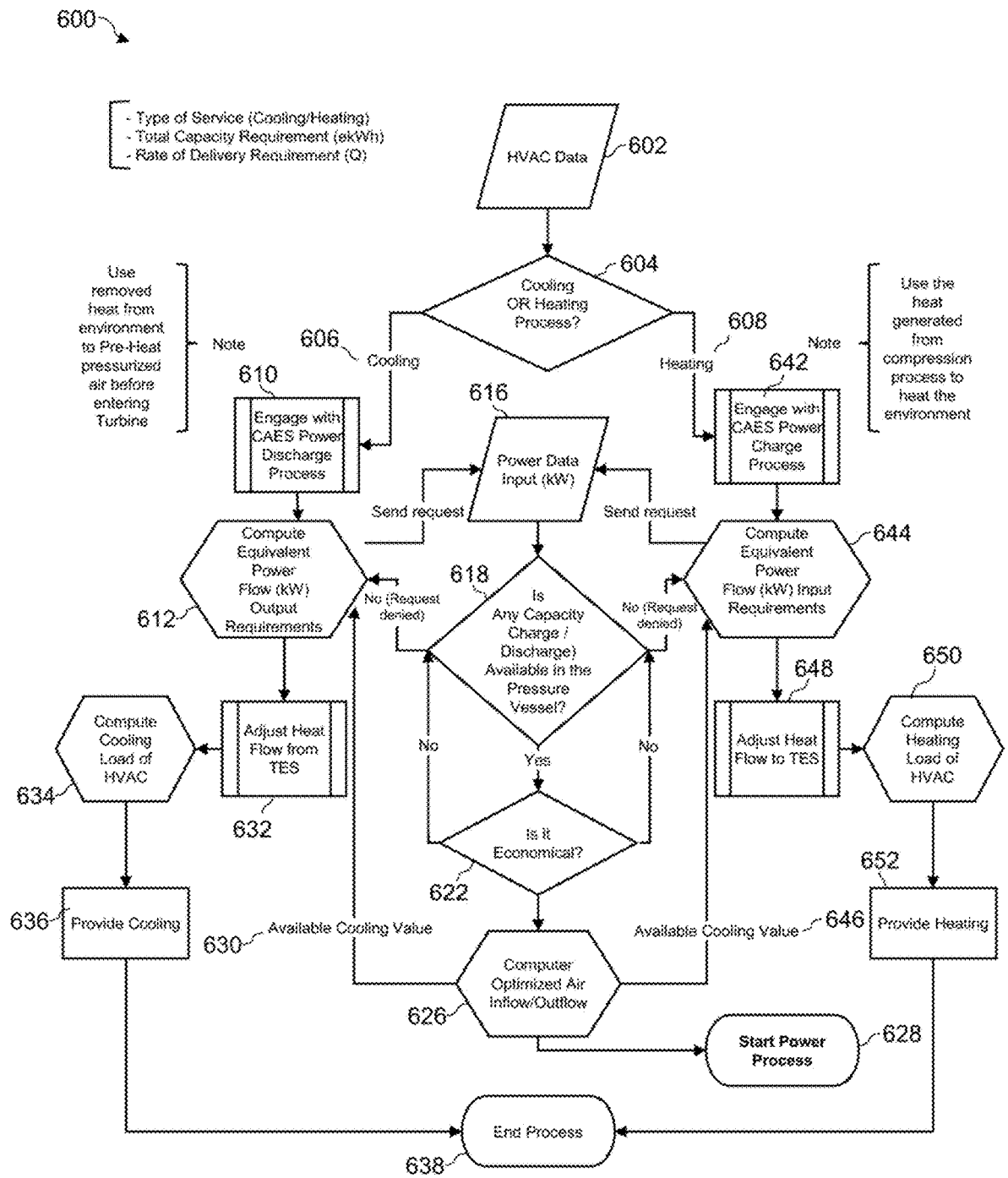
FIG. 6 is a flow diagram of a process flow for an HVAC process implemented by a CAES system, according to an embodiment.

Referring now to FIG. 6, shown therein is a process flow 600 for an HVAC process implemented by a CAES system such as system 100 of FIG. 1, according to an embodiment. The process flow 600 may be the HVAC process 440 of FIG. 4.

The process flow 600, or portions thereof, may be implemented by the energy management unit 144 of FIG. 1, and in particular by the software 152. The process flow 600 may be implemented as one or more software modules that, when executed, cause the executing device to perform the actions, functions, and operations described by the process flow 600.

The process flow 600 may interact with one or more additional process flows described herein, such as the power process flow 500 of FIG. 5.

The process flow 600 can implement a cooling process to provide a cooling service. The cooling process may be used to reduce the ambient temperature of the facility at which the CAES system 100 is operating.

The cooling process may use heat removed from the environment to preheat pressurized air before entering the generation subsystem # to cool the environment, such as described in FIG. 5.

The process flow 600 can implement a heating process to provide a heating service. The heating process may be used to increase the ambient temperature of the facility at which the CAES system 100 is operating. The heating process can use heat generated from the compression process (storage process) to heat the environment.

Heating and cooling services may be provided to the facility, at least in part, by the HVAC system 136.

The energy management unit 144 receives HVAC data 602 as input to the process 600. The HVAC data 602 is stored in memory.

The HVAC data 602 includes service type data, total capacity requirement data (e.g. in ekWh), and rate of delivery requirement data (flow rate). The service type data includes a service type, which may be a cooling service or a heating service.

At 604, the energy management unit 144 analyzes the HVAC data 602 and determines whether to initiate a cooling process 606 or a heating process 608. The determination 604 may be based on the service type data. For example, if the service type data indicates a cooling service, the determination 604 may initiate the cooling process 606.

At 610, the cooling process 606 engages with the power discharge process of the CAES system 100. This includes initializing the discharge process in which air is decompressed in order to provide cooling.

Generally, the power discharge process of the CAES system 100 is similar to generation process 518 of FIG. 5 and involves generating power using compressed air stored in the compressed air storage 108. The compressed air 114 is released from the air storage 112, preheated using heat 110 from the TES 106, and provided to the generator subsystem 126. This may include using removed heat removed from the environment to preheat pressurized air 114 before entering the turbine 134.

At 612, the energy management unit 144 computes equivalent power flow output requirements. The equivalent power flow output requirements data can be computed based on a power rating of the turbine and the duration it needs to run and the equivalent compressed air flow (m^3/s) that needs to enter the turbine which needs to be preheated (absorb the heat from the environment which results cooling). The energy management unit 144 sends a request to turn on the discharge process. The equivalent power flow output requirements includes a power flow output required to provide the requested cooling service (i.e. a power flow output provided by the power subsystem 418 to provide the desired cooling service).

Once the request generated at 612 is sent, a power data input 616 is used in an available discharge capacity determination at 618. The power data input 616 is the calculated power flow data from 612.

The determination at 618 includes determining whether there is any discharge capacity available in the pressure vessel 112 using the equivalent power flow output requirement data 612 and power data input 616. The determination 618 is performed by the energy management unit 144. The discharge capacity is the amount of air which should be decompressed in order to compensate for the cooling shortage in the system. The discharge capacity is calculated based on the volume, pressure, and temperature of the stored compressed air.

If it is determined at 618 that discharge capacity is not available in the pressure vessel 112, the request is denied. If the request is denied, the energy management 144 unit determines that required cooling should be provided by the facility HVAC system. The energy management unit 144 may communicate with the facility HVAC system to facilitate the provision of cooling.

If it is determined at 618 that discharge capacity is available in the pressure vessel 112, at 622, the energy management unit 144 determines whether it is economical to use the available discharge capacity. For example, if the stored high-pressure air is decompressed just for the sake of cooling generation, then there might not be enough capacity left in the system when electricity is required. As a result, the energy management unit 144 determines whether to use the compressed air to provide cooling or save the compressed air for electricity generation based on economic factors. The economic factors may be represented in the system by economic factor data stored at the energy management unit 144.

If it is determined at 622 that using the available discharge capacity is not economical, the request is denied.

If it is determined at 622 that using the available discharge capacity in the pressure vessel 112 is economical, the process flow 600 proceeds to 626.

At 626, the energy management unit 144 computes optimized air outflow data. The optimized air data outflow includes an air flow rate from the pressure vessel 112 (i.e. flow of compressed air discharged from the vessel 112).

At 628, a power process is started (e.g. power process 500) using the optimized air outflow data generated at 626 as input.

Also, at 628, the energy management unit uses the optimized air outflow data to determine an available cooling value 630. The available cooling value 630 is stored as available cooling value data by the energy management unit 144.

The available cooling value 630 represents the portion of the optimized air outflow determined at 626 that is available to use to provide the cooling service. The available cooling value 630 is collected from one or more sensors 148 (e.g. thermostat) within the system and environment (facility) that are integrated or connected to the main system and the energy management unit 144.

At 632, the heat flow from the TES 106 is adjusted based on the equivalent power flow output requirement computed at 632. This may include the energy management unit 144 sending a signal to the control equipment 150 to adjust the flow from the TES 106.

At 634, the energy management unit 144 computes a cooling load of the HVAC subsystem 136. The cooling load is stored by the energy management unit 144 as cooling load data.

At 636, the cooling load determined at 634 is used to provide cooling to the facility.

At 638, the cooling process 606 ends.

If, at 604, the energy management unit 144 determines that a heating process 608 should be initiated, the heating process 608 engages with the power charge process of the CAES system 100 (i.e. storage process 510 of FIG. 5) at 642. Engaging the power charge process includes initializing the charge process in which air is compressed in order to provide heat.

Generally, the power charge process of the CAES system 100 is similar to storage process 518 of FIG. 5 and involves storing energy using compressed air stored in the compressed air storage 108. The air compression process generates heat 110 that can be used to heat the environment.

At 644, the energy management unit 144 computes equivalent power flow input requirements and sends a request to turn on the charge process. The equivalent power flow input requirements includes a power flow input required to provide the requested heating service (i.e. a power flow input provided by the power subsystem 418 to provide the desired heating service).

Once the request generated at 644 is sent, power data input 616 is used in an available charge capacity determination at 618. The power data input 616 in this case is the calculated power flow data from 644.

The determination at 618 includes determining whether there is any charge capacity available in the pressure vessel 112 using the equivalent power flow input requirement data 644 and power data input 616. The determination 618 is performed by the energy management unit 144. The charge capacity is the amount of air which should be compressed in order to compensate for the heating shortage in the system. The charge capacity is calculated based on the volume, pressure, and temperature of the stored compressed air.

If it is determined at 618 that charge capacity is not available in the pressure vessel 112, the request is denied. If the request is denied, the energy management 144 unit determines that required heating should be provided by the facility HVAC system. The energy management unit 144 may communicate with the facility HVAC system to facilitate the provision of heating.

If it is determined at 618 that charge capacity is available in the pressure vessel 112, at 622, the energy management unit 144 determines whether it is economical to use the available charge capacity. For example, if air is compressed just for the sake of heating generation, then there might not be enough capacity left in the system when another service is required. As a result, the energy management unit 144 determines whether to compress air to provide heating or not based on economic factors. The economic factors may be represented in the system by economic factor data stored at the energy management unit 144.

If it is determined at 622 that using the available charge capacity is not economical, the request is denied.

If it is determined at 622 that using the available charge capacity in the pressure vessel 112 is economical, the process flow 600 proceeds to 626.

At 626, the energy management unit 144 computes optimized air inflow data. The optimized air outflow data includes an air flow rate from the pressure vessel 112 (i.e. flow of compressed air charged into the vessel 112). Optimized air inflow/outflow is based on the specific requirements and limitations of each system at the time of operation.

At 628, a power process is started (e.g. power process 500) using the optimized air inflow data generated at 626 as input.

Also, at 628, the energy management unit 144 uses the optimized air inflow data to determine an available heating value 646. The available heating value 646 is stored as available heating value data by the energy management unit 144. The available heating value 646 is collected from one or more sensors 148 (e.g. thermostat) within the system and environment (facility) that are integrated or connected to the main system and the energy management unit 144.

The available heating value 646 represents the portion of the optimized air inflow determined at 626 that is available to use to provide the heating service.

At 648, the heat flow to the TES 106 is adjusted based on the equivalent power flow input requirement computed at 644. This may include the energy management unit 144 sending a signal to the control equipment 150 to adjust the flow to the TES 106.

At 650, the energy management unit 144 computes a heating load of the HVAC subsystem 136. The heating load is stored by the energy management unit 144 as heating load data. The heating load is the amount of heat required by the facility HVAC system due to heat shortage in the facility.

At 652, heating is provided to the facility by the HVAC subsystem 136 based on the heating load determined at 650.

At 638, the heating process 608 ends.

Referring now to FIG. 7, shown therein is a process flow for a pneumatic process 700 implemented by a CAES system, according to an embodiment. The process flow 700 may be the pneumatic process 444 of FIG. 4.

The CAES system may be the CAES system 100 of FIG. 1. The process flow 700, or a portion thereof, may be implemented by the energy management unit # of FIG. 1. The process flow 700 may be implemented as one or more software modules that, when executed, cause the executing device to perform the actions, functions, and operations described by the process flow 700.

The process flow 700 may use compressed air discharged from the compressed air storage 108 to power an end-use device (e.g. end-use device 142 of FIG. 1). The end-use device 142 may be a device that uses compressed air to operate, such as tool, device, or system (e.g. compressed air tool used in manufacturing).

The process flow 700 may control a process wherein compressed air 114 that is discharged from the air storage 108 bypasses the [generation subsystem 126 (turbine 134) and is delivered to the end-use device 142 for use.

The bypass may be effected by the flow transportation subsystem 116 (e.g. valves 120) of FIG. 1, including control equipment 150 involved in the operation thereof. The flow transportation subsystem 116 fluidly connects the air storage 108 to the end-use device 142 and includes a bypass mechanism for effecting the transportation of the compressed air 114 from the air storage 108 to the end-use device 142.

Process flow 700 uses pneumatic data 702 as an input. The pneumatic data 702 includes total capacity requirement data (which may be in ekWh) and rate of delivery requirement data (flow rate). The pneumatic data is stored by the energy management unit 144. The pneumatic subsystem is the integration point with the facility compressed air supply system. The total capacity represents the available compressed air in the storage 108 and is defined in terms of volume and pressure. The rate of delivery requirement data represents the flow of required compressed air (which may be in m$^3$/hr).

At 704, the process flow 700 engages with a CAES power discharge process, such as the generation process 518 of FIG. 5. At this stage, discharged air 543 from air storage 534 may start bypassing turbine 544 of the generation subsystem 126. Under normal circumstances, the discharge process includes discharging compressed air from the air storage tank 534 and using the discharged air 543 as input to the generation subsystem 126 to generate power 546.

At 706, the energy management unit 144 computes equivalent power flow (which may be in kW) output requirements. The equivalent power flow output requirements is stored as equivalent power flow output requirements data in memory of the computing device 146. The equivalent power flow output requirements may be determined by using the pneumatic data 702 to compute a power flow output value representing the power flow needed from the discharge process to provide the required compressed air 144. The power flow output data is recognized and used by the generation subsystem 126 to provide power flow.

Using the computed equivalent power flow output requirement generated at 706, a request is sent.

Upon sending the request, a power data input 710 (which may be in kW) is used in a pressure vessel discharge capacity determination at 712. The power data input 710 by energy management unit 144. The power data 710 is the output of the computation at 706.

At 712, the power data input 710 is used to determine whether there is discharge capacity available in the pressure vessel 112. Discharge capacity represents compressed air that is stored in pressure vessel 112 and available for discharge and use. Pressure vessel discharge capacity may be stored as discharge capacity data by the energy management unit 144. Discharge capacity data may be collected using sensors 148 of the energy management unit 144 (e.g. a sensor 148 of the pressure vessel 112 configured to measure the discharge capacity of the pressure vessel 112, for example at constant intervals).

If discharge capacity is not available in the pressure vessel 112, the request is denied.

If discharge capacity is available in the pressure vessel 112, the process flow 700 proceeds to determination 716.

At 716, the energy management unit 144 determines whether cooling is required.

If cooling is not required, at 718, the energy management unit 144 computes an optimized air inflow/outflow.

If cooling is required, the process 700 engages with the CAES HVAC process (e.g. HVAC process 440, 600) at 720.

At 722, the energy management unit 144 computes a cooling load of the HVAC subsystem. The cooling load is used to compute the optimized air inflow/outflow at 718.

The computed optimized air inflow/outflow from 718 is used to start an HVAC process at 724 and a power process at 726.

Computing the optimized inflow/outflow at 718 includes generating an available compressed air and HVAC output 728. The available compressed air and HVAC output 728 is determined based on the size of the system and how the system is operated.

The available compressed air and HVAC output 728 is used in computing the equivalent power flow output requirements at 706.

At 730, the computed equivalent power flow output requirements computed at 706 is used to adjust the air flow from the pressure vessel 112. For example, based on the airflow that passes through the expander (turbine) and minimum heat transfer requirements, the power generated can be calculated.

At 732, the energy management unit 144 computes an economic load. The computed economic load is stored as economic load data by the energy management unit 144.

At 734, the economic load data is used to provide compressed air.

At 736, the process 700 ends.

Figure 8:
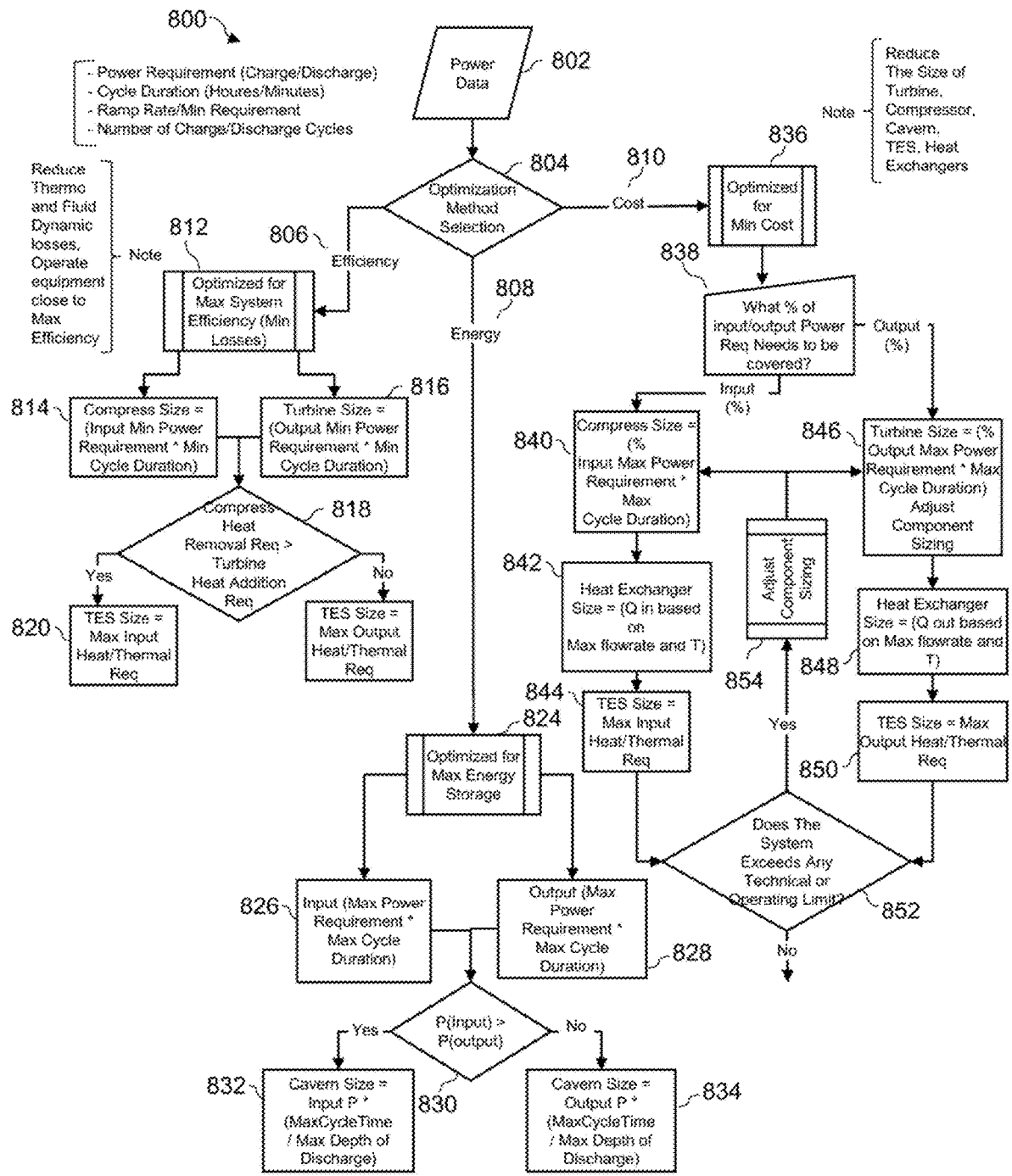
FIG. 8 is a flow diagram of a process flow for a CAES system design optimization, according to an embodiment.

Referring now to FIG. 8, shown therein is a process flow 800 for a CAES system design optimization, according to an embodiment. The process flow 800 may be used in the design of CAES system 100 of FIG. 1.

The process flow 800 may be implemented by a computing device and may be implemented as one or more software modules that, when executed, cause the executing device to perform the actions, functions, and operations described by the process flow 800.

The process flow 800 starts with power data 802. The power data 802 includes a power requirement (charge/ discharge), a cycle duration (hours/minutes), a ramp rate/minimum requirement, and a number of charge/discharge cycles.

At 804, the power data 802 is used in an optimization method selection. The optimization method selection includes a selected method for optimization of the system 100. The optimization method selection may be made by a human interacting with the software implementing process 800 (e.g. via a user interface) or automatically.

The optimization method selection include an efficiency-based optimization 806, an energy-based optimization 808, or a cost-based optimization 810. Each selected optimization 806, 808, 810 includes an associated logic, embodiments of which are described below, that can be implemented as one or more software modules executable on one or more computing devices of the system.

For efficiency optimization 806, at 812, the system is optimized for maximum system efficiency. This includes minimum losses. Maximum system efficiency may include reducing thermo and fluid dynamic losses and operating equipment close to maximum efficiency.

At 814, a compressor 128 size is determined according to the following equation:

$$\text{Compressor size} = \text{(Input minimum power requirement} * \text{minimum cycle duration)}$$

At 816, a turbine 134 size is determined according to the following equation:

$$\text{Turbine size} = \text{(output minimum power requirement} * \text{minimum cycle duration)}$$

At 818, a determination of compression/compressor 128 heat removal requirement and turbine heat addition requirement.

At 820, if the compressor 128 heat removal requirement is greater than the turbine 134 heat addition requirement, then a TES 106 size determination is performed at 824.

At 824, the TES 106 size determination is performed according to the following equation:

$$\text{TES size} = \text{Maximum input heat/thermal requirement}$$

At 822, if the compressor heat removal requirement is not greater than (less than or equal to) turbine heat addition requirement, the TES 106 size determination is performed at 826.

At 826, the TES 106 size determination is performed according to the following equation:

$$\text{TES size} = \text{maximum output heat/thermal requirement}$$

For energy optimization 808, at 824, the system 100 is optimized for maximum energy storage.

At 826, an input for energy storage is determined. The input corresponds to:

$$\text{Input(maximum power requirement*max cycle duration)}.$$

At 828, an output for energy storage is determined. The output corresponds to:

$$\text{Output (maximum power} * \text{max cycle duration)}$$

At 830, a determination is performed comparing P (input) and P (output).

At 832, if P (input) is greater than P (output), then cavern 108 size is determined using the following equation:

$$\text{Cavern size} = \text{Input } P * (\text{maximum cycle time/max depth of discharge})$$

At 834, if P (input) is not greater than P (output) (i.e. less than or equal to), then cavern 108 size is determined using the following equation:

$$\text{Cavern size} = \text{Output } P * (\text{maximum cycle time/maximum depth of discharge})$$

For cost optimization 810, at 836, the system 100 is optimized for minimum cost. Optimizing for minimum cost may include reducing the size of any one or more of the turbine 134, compressor 128, cavern 108, TES 106, and heat exchangers 130, 132.

At 838, an input is provided of what percentage of input/output power requirement needs to be covered. The input may be provided by a user or operator of the system.

For input percentage, at 840, compressor 128 size is determined using the following equation:

$$\text{Compressor size} = (\% \text{ input maximum power requirement} * \text{max cycle duration})$$

At 842, heat exchanger 130 size is determined using the following equation:

$$\text{Heat exchanger size} = (\text{Q in based on max flowrate and T})$$

At 844, TES 106 size is determined using the following equation:

$$\text{TES size} = \text{maximum (input heat/thermal requirement)}$$

For output percentage, at 846, turbine 134 size is determined according to the following equation:

$$\text{Turbine size} = (\% \text{ output max power requirement} * \text{maximum cycle duration})$$

At 848, heat exchanger 132 size is determined according to the following equation:

Heat exchanger size = ($Q$ out based on max flowrate and $T$)

At 850, TES 106 size is determined according to the following equation:

TES size = maximum output heat/thermal requirement.

At 852, receiving inputs from the input percentage pathway and output percentage pathway, a determination is performed as to whether the system 100 exceeds any technical or operating limits. Technical or operating limits may be stored as technical and operating limit data.

If it is determined at 852 that the system does not exceed technical or operating limits, the conditions set (calculated) at 840, 842, 844, or at 846, 848, 850, as the case may be, are accepted by the system.

If it is determined at 852 that the system does exceed technical or operating limits, then at 856 a component size adjustment is performed to try and bring the system within technical and operating limits. After performing the component size adjustment, the size determinations at 840, 842 844 and 846, 848, 850 are repeated.

Figure 9:
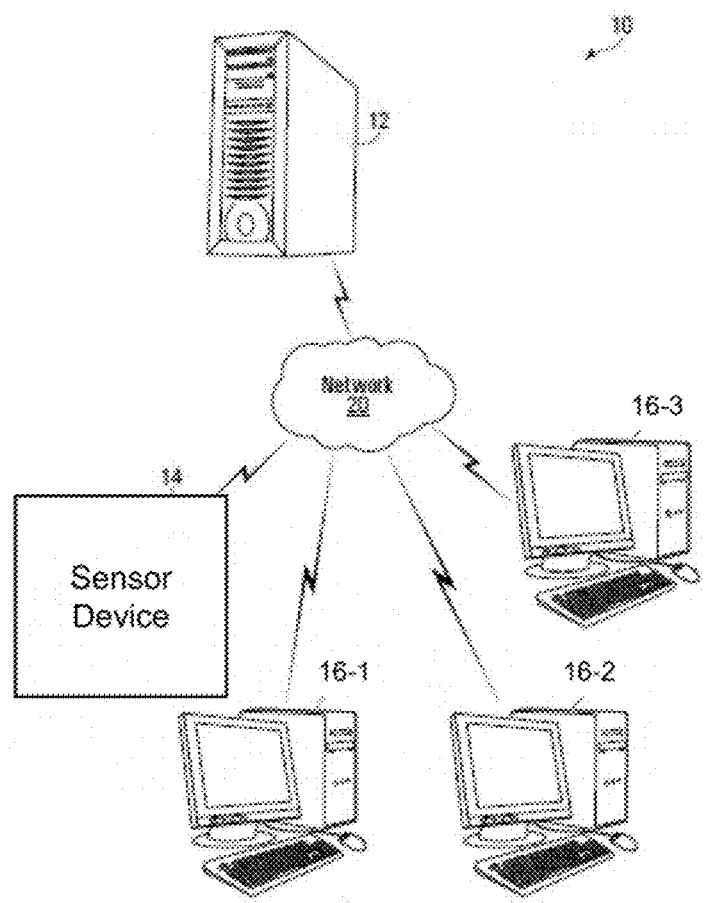
FIG. 9 is a schematic diagram of an energy management unit of a CAES system, according to an embodiment.

Referring now to FIG. 9, shown therein is a block diagram illustrating an energy management unit 144, in accordance with an embodiment. The energy management unit 144 is used by a CAES system such as system 100 of FIG. 1.

The energy management unit 144 includes an energy management server platform 12, which communicates with a plurality of controller devices 16-1, 16-2, and 16-3 (collectively referred to as controllers 16 and generically as controller 16). The controllers 16 may be controller devices that are associated with a particular subsystem (e.g. HVAC, power, pneumatic) or component of a subsystem (e.g. compressor, storage tank, HVAC unit). The system 144 also includes a plurality of sensor devices 14, which can acquire and transmit various sensor data.

The server 12 may be computing device 146, the controller 16 may be control equipment 150, and the sensor device 14 may be sensors 148 of FIG. 1.

The server platform 12 and devices 14, 16 may be a server computer, desktop computer, notebook computer, tablet, PDA, smartphone, or another computing device. The devices 12, 14, 16 may include a connection with the network 20 such as a wired or wireless connection to the Internet. In some cases, the network 20 may include other types of computer or telecommunication networks. The devices 12, 14, 16 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage or may be received from the Internet or other network 20.

Input device may include any device for entering information into device 12, 14, 16. For example, input device may be a keyboard, keypad, cursor-control device, touchscreen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16 may include multiple of any one or more of processors, applications, software modules, second storage devices, network connections, input devices, output devices, and display devices.

Although devices 12, 14, 16 are described with various components, one skilled in the art will appreciate that the devices 12, 14, 16 may in some cases contain fewer, additional or different components. In addition, although aspects of an implementation of the devices 12, 14, 16 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16 and/or processor to perform a particular method.

Devices such as server platform 12 and devices 14, 16 can be described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16 may send information to the server platforms 12 and 14. For example, a user using the device 16 may manipulate one or more inputs (e.g. a mouse and a keyboard) to interact with a user interface displayed on a display of the device 16. Generally, the device may receive a user interface from the network 20 (e.g. in the form of a webpage). Alternatively, or in addition, a user interface may be stored locally at a device (e.g. a cache of a webpage or a mobile application).

Server platform 12 may be configured to receive a plurality of information, from each of the plurality of devices 14, 16.

In response to receiving information, the server platform 12 may store the information in storage database. The storage may correspond with secondary storage of the devices 14, 16. Generally, the storage database may be any suitable storage device such as a hard disk drive, a solid-state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

The server platform 12 may be a purpose-built machine designed specifically for managing and controlling the type and amount of energy stored and used by the CAES system 100. The server 12 may manage and control the flow of air throughout the system 100 in order to provide power, HVAC, and pneumatic services. The server 12 may be configured to optimize outputs of various components of the system 100 in order to reduce power demand and reduce waste energy.

Figure 10:
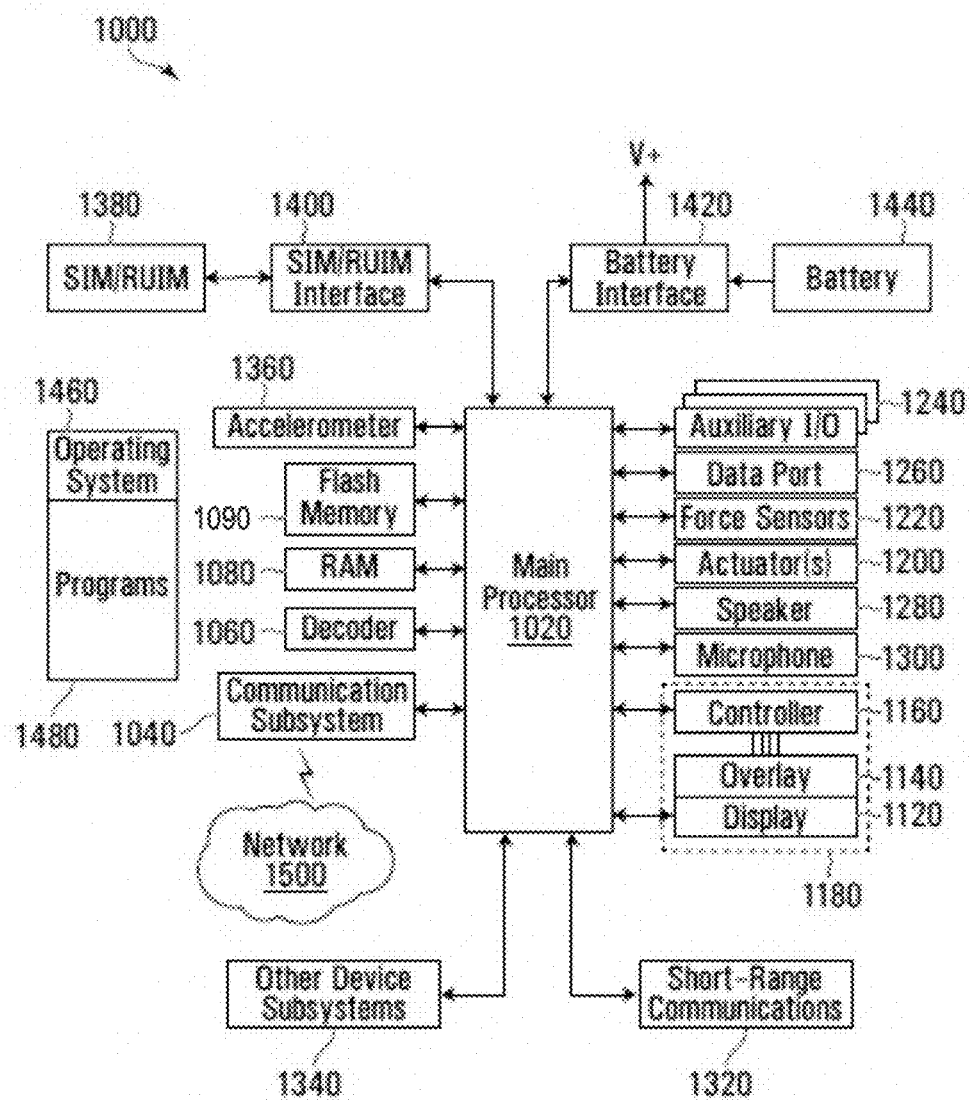
FIG. 10 is a block diagram of a computing device for use in a CAES system, according to an embodiment.

Referring now to FIG. 10, shown therein is a simplified block diagram of components of a computing device 1000, such as a server, computing device, mobile device or portable electronic device. The device 1000 may be computing device 146 of energy management unit 144 or server 12 of energy management unit 10.

The device 1000 may be used to provide various computing functionalities (e.g. processing, storage, communication, etc.) of the energy management unit 10, as described herein. The energy management unit 10, 144 may include a plurality of computing devices 1000 communicatively connected to one another via a communication network, such as a wide area network or local area network.

The device 1000 includes multiple components such as a processor 1020 that controls the operations of the device 1000. Communication functions, including data communications, voice communications, or both may be performed through a communication subsystem 1040. The communication subsystem 1040 may include one or more communication interfaces for receiving and transmitting data. Data received by the device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1090, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1090 or performed using other techniques.

The device 1000 also includes an operating system 1460 and software components 1480 that are executed by the processor 1020 and which may be stored in a persistent data storage device such as the flash memory 1090. Additional applications may be loaded onto the device 1000 through the wireless network 1500, the auxiliary I/O subsystem 1240, the data port 1260, the short-range communications subsystem 1320, or any other suitable device subsystem 1340.

For example, in use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

Figure 11:
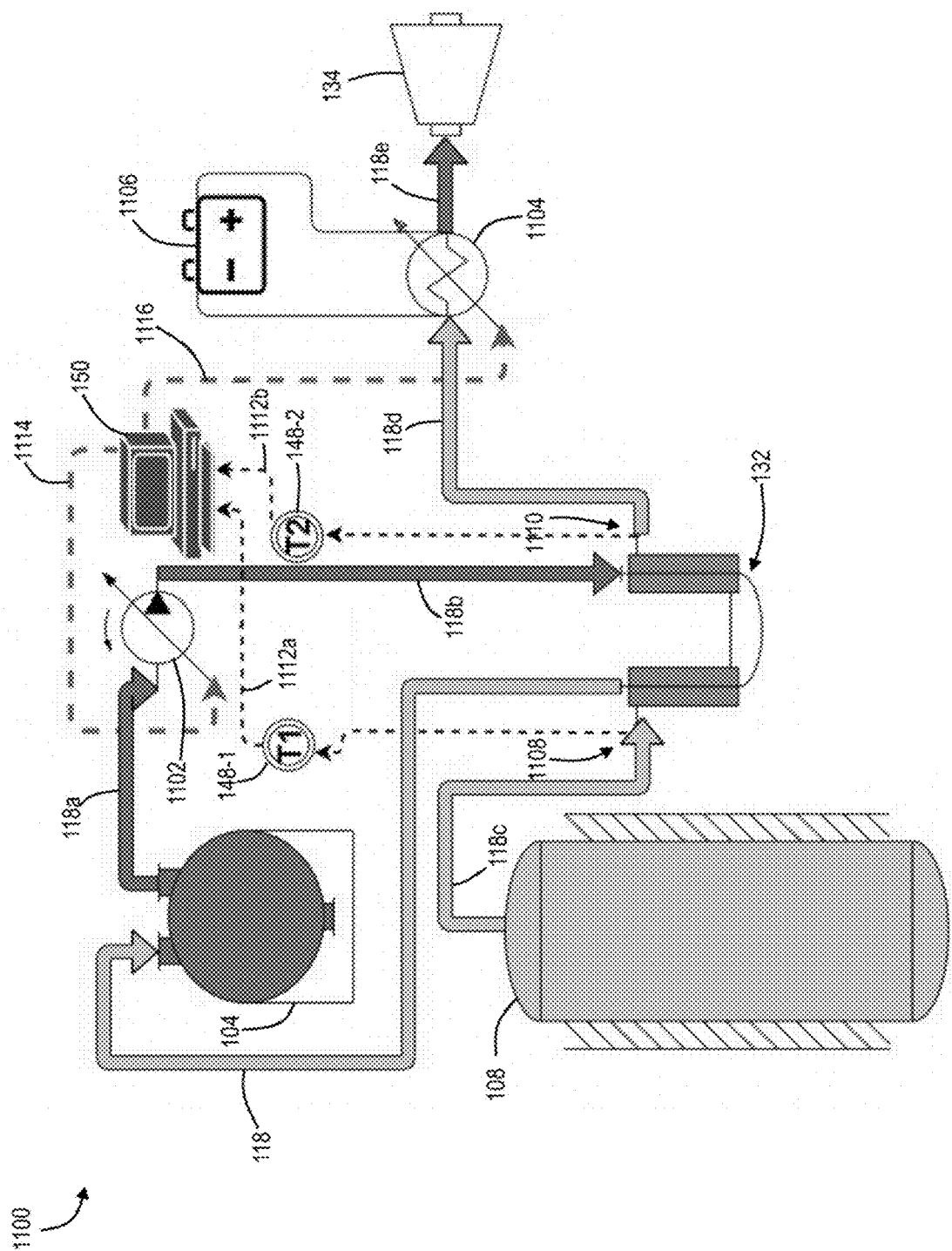
FIG. 11 is a schematic diagram of a CAES system using electric heating to provide rapid response, according to an embodiment.

Referring now to FIG. 11, shown therein is a CAES system 1100 including electric heating for promoting a rapid response, according to an embodiment. The CAES system 1100 is a variant of the CAES system 100 of FIG. 1. Components of the system 1100 having counterpart components performing the same or similar function in the system 100 of FIG. 1 are given the same reference numbers as in FIG. 1. Components of the system 100 of FIG. 1 not shown in FIG. 11 may or may not be present.

The CAES system 1100 provides a rapid response (ramp-up) for a CAES system using electric heating. The electric heating provides an improved or enhanced heating mechanism (e.g. over that in systems 100 or 200 of FIGS. 1 and 2) for the CAES system 1100 that may reduce the delay in heating the cold pressurized air before entering the turbine for power generation.

The system 1100 includes turbine 134. The turbine 134 starts, initiating the heat-up process.

The system 1100 includes a pump 1102. The pump 1102 may be a component of the fluid transport subsystem 116 of FIG. 1. Fluid conduit 118a fluidly connect the TES unit 104 to the pump 1102 and fluid conduit 118b fluidly connects the pump 1102 to the heat exchanger 132.

The pump 1102 starts circulation of hot flow from the TES unit 104. The hot flow is carried from the TES unit 104, through the pump 1102 and to the heat exchanger 132 via fluid conduits 118a, 118b.

The system 1100 includes air tank 108 which provides cold pressurized air to the heat exchanger 132 via fluid conduit 118c. Fluid conduit 118c fluidly connects the air tank 108 to the heat exchanger 132.

The hot flow received at the heat exchanger 132 from the TES unit 104 passes through the heat exchanger 132, heating the cold pressurized air exiting the air tank 108 and arriving at the heat exchanger 132.

Heated air exits the heat exchanger 132 and travels via fluid conduit 118d to an electric heater 1104. The electric heater 1104 is powered by a battery 1106.

The heater 1104 heats up the received heated air flow and outputs the further heated airflow to turbine 134 via fluid conduit 118e.

The turbine 134 generates power from the further heated airflow.

The system 1100 also includes a first temperature sensor 148-1 and a second temperature sensor 148-2 for recording temperature measurements.

The first temperature sensor 148-1 reads a temperature of the air tank 108 output, for example at 1108, prior to processing by the heat exchanger 132. The first temperature sensor 148-1 may thus be positioned at or near 1108.

The second temperature sensor 148-2 reads a temperature of the heat exchanger 132 output, for example at 1110. The second temperature sensor 148-2 may thus be positioned at or near 1110.

The first and second temperature sensors 148-1, 148-2 are connected to control unit 150 via communication links 1112a, 1112b, respectively. The first and second temperature sensors 148-1, 148-2 send collected temperature measurement data or signals to the control unit 150 via the communication links 1112a, 1112b.

The control unit 150 is configured to determine an appropriate (e.g. optimum) control signal based on the received temperature measurement signals from the first and second temperature sensors 148-1, 148-2.

The temperature measurement of the first temperature sensor 148-1 (T1 measurement) is used by the control unit 150 to control the pump 1102 for an optimized hot air mass flow rate. Accordingly, the control unit 150 may determine a pump control signal for the optimized hot air flow rate and send the pump control signal via a communication link 1114 connecting the control unit 150 to the pump 1102. The pump 1102 is configured to automatically adjust an operating parameter according to the received pump control signal. Adjusting the operating parameter of the pump 1102 adjusts the flow rate of the hot air from the TES unit 104 to the heat exchanger 132.

The temperature measurement of the second temperature sensor 148-2 (T2 measurement) is used by the control unit 150 to control a heat output of the electric heater 1104. For example, the control unit 150 may control the heat output of the electric heater 1104 to a desired temperature (T). Accordingly, the control unit 150 may determine an electric heater signal based on the received T2 measurement and send the electric heater signal via a communication link 1116 connecting the control unit 150 to the heater 1104. The electric heater 1104 is configured to automatically adjust an operating parameter according to the received electric heater signal. Adjusting the operating parameter adjusts the heat output of the electric heater 1104. Generally, as the T2 measurement trends to the desired temperature, the electric heater 1104 gradually decreases its heat output (according to the received heater control signal). The heater 1104 may shut down when the T2 measurement reaches the desired temperature. In such a case, the control unit 150 receives a T2 measurement from the second temperature sensor 148-2 via the communication link 1112b and determines that the T2 measurement has reached the desired temperature (the desired temperature value being stored at or otherwise accessible to the control unit 150) and sends a heater control signal which, when received by the heater 1104, causes the heater 1104 to shut down.

The system 1100, and in particular the electric heater 1104 and related control mechanism, may advantageously provide for a rapid response to quickly heat up the airflow, reducing the time the system 1100 takes to go online. For example, in embodiments without the electric heater 1104 (and related sensing and control), the system 1100 may take 10 to 15 minutes to come online to get the air to be input to the generator 134 to a temperature where the generator 134 can be started (e.g. to a temperature where you can start to put a load on it). Advantageously, the electric heater 1104 can help get the air to the appropriate temperature quickly, avoiding some time delay, and once the air reaches the desired temperature the electric heater 1104 can be turned off. The system 1100 may thus provide an improved response time.

While the above description provides examples of one or more apparatus, methods, or systems, it will be appreciated that other apparatus, methods, or systems may be within the scope of the claims as interpreted by one of skill in the art.

The invention claimed is:

1. A control system for a compressed air energy storage ("CAES") system, the control system comprising:
   a first temperature sensor for recording a first temperature measurement of compressed air that is output from a pressurized air storage vessel to a heat exchanger, prior to entering the heat exchanger;
   a second temperature sensor for recording a second temperature measurement of the compressed air after passing through the heat exchanger; and
   a flow sensor to measure a flow rate of the compressed air exiting the pressurized air storage vessel;
   a control unit for:
   receiving the first and second temperature measurements from the first and second temperature sensors, respectively, and the flow rate;
   adjusting a heat rate of an electric heater of the CAES system based on the second temperature measurement and the flow rate, the electric heater disposed between the heat exchanger and a turbine of the CAES system, the electric heater for heating the compressed air after passing through the heat exchanger and before entering the turbine; and
   controlling flow of the compressed air entering the heat exchanger using a flow control valve, based on the first temperature measurement and the flow rate.

2. The control system of claim 1, wherein the electric heater is battery powered.

3. The control system of claim 1, wherein the control unit adjusts flow of stored heat from a thermal energy storage of the CAES system to the heat exchanger by controlling an operating parameter of a pump between the thermal energy storage and the heat exchanger.

4. The control system of claim 1, further comprising an energy management computer device in communication with the control unit, the energy management computer device for controlling storage and delivery of a plurality of energy formats by the CAES system.

5. The control system of claim 4, wherein the plurality of energy formats includes at least two of electricity, thermal energy, and pneumatic energy.

6. The control system of claim 4, wherein the energy management computer device is configured to: monitor a demand for any one or more of compressed air for a pneumatic service, heat/cold for a thermal energy service, and electricity for a power service; determine an optimized flow of the compressed air in the CAES system to satisfy the demand for the respective service; and send control instructions for the optimized flow to the control unit.

7. The control system of claim 4, wherein the energy management computer device stores system optimization rules, heat stored data, compressed air stored data, and energy service demand data in memory and determines operating parameters of the CAES system based on the heat stored data, the compressed air stored data, the energy service demand data, and the system optimization rules.

8. The control system of claim 4, wherein the plurality of energy formats includes electricity, thermal energy, and pneumatic energy.

9. The control system of claim 8, wherein the energy management computer device monitors a balance of the plurality of energy formats in a facility serviced by the CAES system and optimizes an output of the CAES system that minimizes cost and reduces total energy loss.

10. A method of controlling operation of a compressed air energy storage ("CAES") system, the method comprising:
recording, with a first temperature sensor, a first temperature measurement of compressed air exiting a pressurized air storage vessel and entering a heat exchanger;
recording, with a second temperature sensor, a second temperature measurement of the compressed air after passing through the heat exchanger;
measuring a flow rate of the compressed air exiting the pressurized air storage vessel;
adjusting flow of the compressed air into the heat exchanger using a flow control valve, based on the first temperature measurement and the flow rate; and
controlling a heat output of an electric heater of the CAES system based on the flow rate and the second temperature measurement, the electric heater disposed between the heat exchanger and a turbine of the CAES system, the electric heater for heating the compressed air after passing through the heat exchanger and before entering the turbine.

11. The method of claim 10, wherein the CAES system includes a storage subsystem including an air compressor, the pressurized air storage vessel, and a thermal energy storage, a generation subsystem including the turbine, and a flow transportation subsystem including the flow control valve, and wherein the method further comprises:
determining, by an energy management computer device, operating parameters for each of the air compressor, the turbine, and the flow control valve based on thermal energy stored data indicating a quantity of thermal energy stored by the thermal energy storage, compressed air stored data indicating a quantity of compressed air stored by the pressurized air storage vessel, power service demand data, second energy service demand data, and system optimization rules;
generating control data encoding instructions for implementing the determined operating parameters; and
transmitting the control data to the control unit, wherein the control unit controls each of the flow control valve, the air compressor, and the turbine.

12. The method of claim 10, wherein the electric heater is battery powered.

13. The method of claim 10, wherein the CAES system stores and delivers a plurality of energy formats including at least two of electricity, thermal energy, and pneumatic energy.

14. The method of claim 10, wherein the CAES system stores and delivers a plurality of energy formats including electricity, thermal energy, and pneumatic energy.

15. The method of claim 10, further comprising using an energy management computer device in communication with the control unit to monitor a balance of a plurality of energy formats in a facility serviced by the CAES system and optimize an output of the CAES system that minimizes cost and reduces total energy loss.

16. The method of claim 10, further comprising:
monitoring, by an energy management computer device in communication with the control unit, a demand for any one or more of compressed air for a pneumatic service provided by the CAES system, electricity for a power service provided by the CAES system, and heating, ventilation, and air conditioning (HVAC) load for an HVAC service provided by the CAES system;
determining, by the energy management computer device, an optimized flow of the compressed air in the CAES system to satisfy the demand for the respective service; and
sending, by the energy management computer device, control instructions for the optimized flow to the control unit.

17. The method of claim 10, further comprising determining, by an energy management computer device in communication with the control unit, operating parameters of the CAES system by applying system optimization rules stored in memory of the energy management computer device to data stored in the memory of the energy management computer device including an energy service demand data indicating a demand for an energy service of the CAES system and sensor data indicating an amount of heat stored by the CAES system and an amount of compressed air stored by the CAES system.

18. The method of claim 10, further comprising adjusting flow of stored heat from a thermal energy storage of the CAES system to the heat exchanger by controlling an operating parameter of a pump between the thermal energy storage and the heat exchanger.

* * * * *